(12) United States Patent
Suzuki et al.

(10) Patent No.: US 7,751,095 B2
(45) Date of Patent: Jul. 6, 2010

(54) IMAGE SCANNING APPARATUS SCANNING COLOR ORIGINAL DOCUMENT WHILE CONVEYING THE SAME AND COLOR DETERMINATION METHOD

(75) Inventors: Hiroyuki Suzuki, Toyokawa (JP); Kazuhiro Ishiguro, Toyohashi (JP); Hideyuki Toriyama, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 821 days.

(21) Appl. No.: 11/702,566

(22) Filed: Feb. 6, 2007

(65) Prior Publication Data

US 2007/0188828 A1    Aug. 16, 2007

(30) Foreign Application Priority Data

Feb. 7, 2006    (JP)    ............................. 2006-029831

(51) Int. Cl.
*H04N 1/40* (2006.01)
*H04N 1/38* (2006.01)
*G06K 9/36* (2006.01)
*G03G 15/04* (2006.01)

(52) U.S. Cl. ...................... 358/474; 358/447; 358/463; 382/291; 399/213

(58) Field of Classification Search ................ 358/505, 358/474, 443, 447, 448, 452, 463, 464, 482, 358/483, 493, 494, 497; 382/151, 312, 313, 382/315, 318, 291; 399/166, 167, 213, 215
See application file for complete search history.

(56) References Cited

U.S. PATENT DOCUMENTS 5,701,505 A * 12/1997 Yamashita et al. ............ 712/11
7,253,932 B2 * 8/2007 Tsutsumi ................... 358/498

2001/0026380 A1    10/2001  Imoto
2007/0053582 A1 *  3/2007  Yamashita .................. 382/151

(Continued)

FOREIGN PATENT DOCUMENTS

JP    2000-287031 A    10/2000

(Continued)

OTHER PUBLICATIONS

Japanese Notice of Grounds of Rejection, mailed on Dec. 9, 2008, directed to counterpart Japanese Patent Application No. 2006-029831; 7 pages.

*Primary Examiner*—Jerome Grant, II
(74) *Attorney, Agent, or Firm*—Morrison & Foerster LLP

(57) ABSTRACT

An image scanning apparatus moves a copyboard provided between an original document and three line sensors and the three line sensors relatively to each other at a speed different from the speed of conveying an original document. An in-line correction portion allows three data output by three line sensors to be synchronized so that a foreign object on the copyboard appears at different positions of the original document in chromatic color. A foreign object position detection portion detects a position on the copyboard of a foreign object before an original document is conveyed, and a color determination portion decides a determination pixel for use in determination from a plurality of pixels included in each of scanned data obtained while the original document is conveyed, based on the position of the foreign object, and determines whether the original document is color or black-and-white based on the determination pixel.

16 Claims, 14 Drawing Sheets

U.S. PATENT DOCUMENTS

2008/0279374 A1 * 11/2008 Beak et al. .................... 380/54

FOREIGN PATENT DOCUMENTS

| JP | 2001-272829 A | 10/2001 |
| JP | 2002-344697 | 11/2002 |
| JP | 2003-259133 A | 9/2003 |
| JP | 2004-104718 | 4/2004 |
| JP | 2004-201136 A | 7/2004 |
| JP | 2005-080101 A | 3/2005 |

* cited by examiner

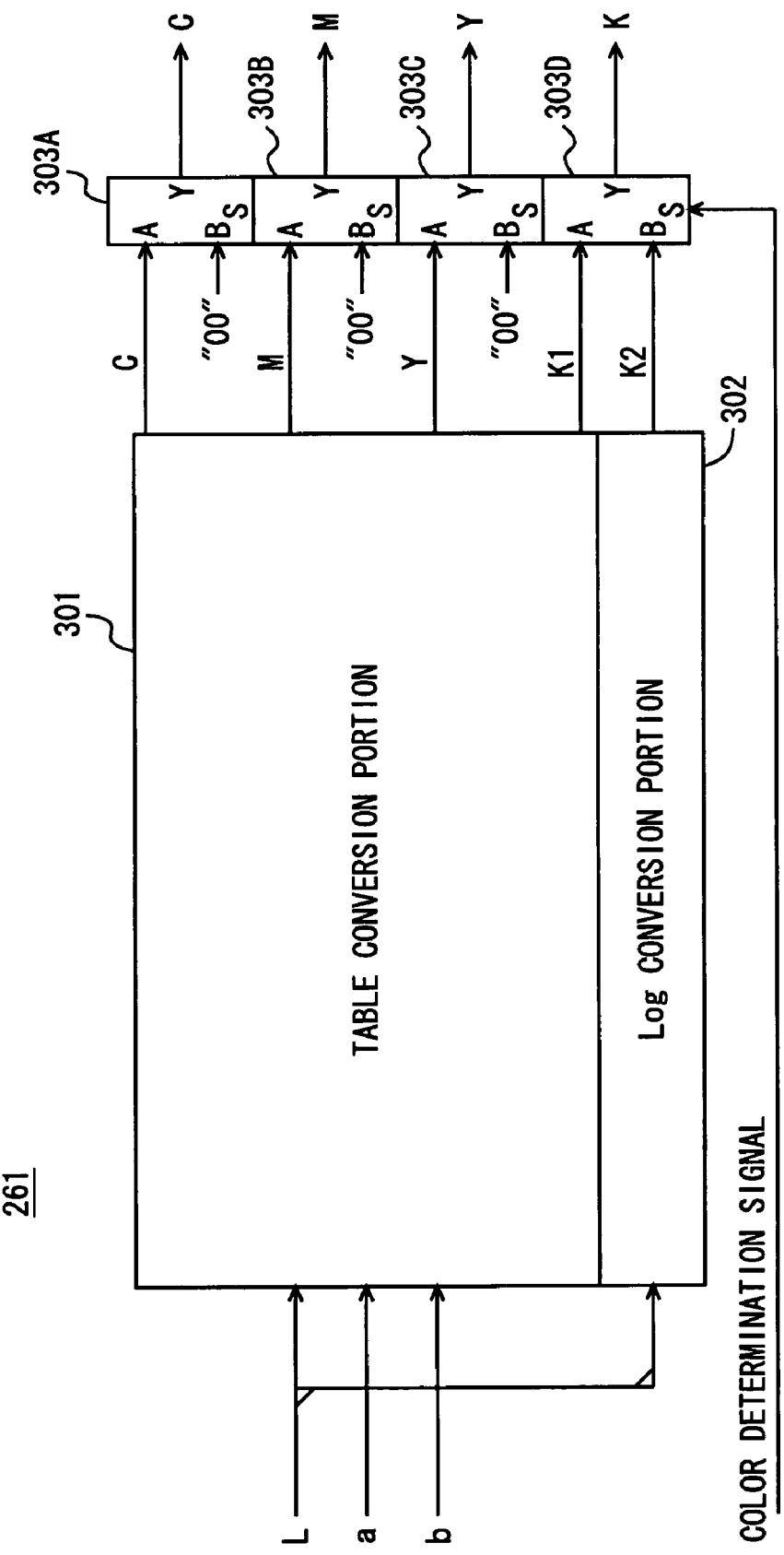

IMAGE SCANNING APPARATUS SCANNING COLOR ORIGINAL DOCUMENT WHILE CONVEYING THE SAME AND COLOR DETERMINATION METHOD

This application is based on Japanese Patent Application No. 2006-29831 filed with Japan Patent Office on Feb. 7, 2006, the entire content of which is hereby incorporated by reference.

BACKGROUND OF THE INVENTION

1. Field of the Invention

The present invention relates to an image scanning apparatus and a color determination method, and more particularly to an image scanning apparatus scanning a color original document while conveying the same.

2. Description of the Related Art

In recent years, Multi Function Peripherals (referred to as "MFP" hereinafter) that capture color image data by scanning an original document with three line sensors of red (R), green (G) and blue (B) are distributed. On the other hand, in order to scan a black-and-white original document, three data output from the three line sensors of red (R), green (G) and blue (B) are converted into one binary data or multi-value data to be processed. Therefore, Automatic Color Selection (ACS) function is provided to identify whether an original document is color or black-and-white.

On the other hand, some MFPs employ a scanning method of scanning an original document with three line sensors fixed in a main scanning direction by conveying the original document in a sub-scanning direction orthogonal to the main scanning direction. This MFP includes a transparent copyboard between the original document and the line sensor for keeping the distance between the original document and the line sensor constant at a scanning position. The light reflected by the original document is transmitted through the copyboard and received by the line sensor. Consequently, a problem arises when a foreign object is stuck on the copyboard and the line sensor scans the foreign object instead of the original document, thereby generating a streak of noise in the image data.

An image forming apparatus that prevents a streak of noise in image data is disclosed in Japanese Laid-Open Patent Publication No. 2002-344697. This conventional image forming apparatus includes an image scanning apparatus scanning an image while conveying an original document, which includes an exposure unit movable in such a manner as to reciprocate in the direction of conveyance of an original document and a control unit controlling the speed of conveyance of the original document and the speed of moving the exposure unit, characterized in that an image is scanned while an original document is conveyed and the exposure unit is moved. However, in-line correction allows three data output by three line sensors to be synchronized such that three data become data that are output by three line sensors respectively scanning the same portion of the original document. Therefore, if a foreign object exists on the copyboard, the foreign object is scanned at different positions of the original document respectively by three line sensors. Accordingly, in spite of a black-and-white original document, the portion where the foreign object is scanned becomes chromatic, so that the document is erroneously identified as a color document by ACS.

SUMMARY OF THE INVENTION

The present invention is made to solve the aforementioned problem. An object of the present invention is to provide an image scanning apparatus with improved accuracy of color determination.

Another object of the present invention is to provide a color determination method with improved accuracy of color determination of an original document.

In order to achieve the aforementioned object, in accordance with an aspect of the present invention, an image scanning apparatus includes: a plurality of line sensors having filters having spectral sensitivities different from each other and being arranged at intervals in a sub-scanning direction in a predetermined order to scan an original document in the sub-scanning direction; a copyboard provided between an original document and the plurality of line sensors; an original document conveyance portion to convey an original document to a scanning position of the plurality of line sensors; a moving portion to move the copyboard and the plurality of line sensors relatively to each other at a speed different from a speed at which the original document conveyance portion conveys an original document; an in-line correction portion to synchronize a plurality of data, each including a plurality of pixels, output by the plurality of sensors such that the plurality of data become data that are output by the plurality of line sensors respectively scanning a same portion of an original document; a position detection portion to detect a position on copyboard of a foreign object stuck on the copyboard before the original document conveyance portion conveys an original document; a determination pixel decision portion to decide a determination pixel to be used for determination from a plurality of pixels included in each of a plurality of scanned data output by the in-line correction portion while an original document is passing through the scanning position, based on a position detected by the position detection portion; and a determination portion to determine whether an original document is color or black-and-white, based on the decided determination pixel of each of the plurality of scanned data.

In accordance with this aspect, a plurality of line sensors having filters having spectral sensitivities different from each other and scanning an original document in the sub-scanning direction are arranged at intervals in the sub-scanning direction in a predetermined order. A copyboard provided between an original document and the plurality of line sensors and the plurality of line sensors move relatively to each other at a speed different from the speed of conveying an original document. In addition, a plurality of data output by the plurality of line sensors are synchronized such that the plurality of data become data that are output by the line sensors respectively scanning the same portion of the original document. Thus, if a foreign object exists on the copyboard, that foreign object is scanned at different portions of the original document respectively by the plurality of line sensors. Accordingly, in spite of a black-and-white original document, the portion where the foreign object is scanned becomes chromatic. The image scanning apparatus detects a position on the copyboard of a foreign object stuck on the copyboard before an original document is conveyed, decides a determination pixel for use in determination from a plurality of pixels included in each scanned data obtained while the original document is conveyed to the scanning position, and determines whether the original document is color or black-and-white based on the decided determination pixel. Therefore, it is determined whether the original document is color or black-and-white at a portion other than the portion where the foreign object is scanned. Thus, it is possible to provide an image scanning apparatus with improved accuracy of color determination.

In accordance with another aspect of the present invention, a color determination method is performed in an image scanning apparatus including a plurality of line sensors having filters having spectral sensitivities different from each other and being arranged at intervals in a sub-scanning direction in a predetermined order to scan an original document in the sub-scanning direction, a copyboard provided between an original document and the plurality of line sensors, an original document conveyance portion to convey an original document to a scanning position of the plurality of line sensors, and a moving portion to move the copyboard and the plurality of line sensors relatively to each other at a speed different from a speed at which the original document conveyance portion conveys an original document. The method includes the steps of synchronizing a plurality of data, each including a plurality of pixels, output by the plurality of line sensors such that the plurality of data become data that are output by the plurality of line sensors respectively scanning a same portion of an original document; detecting a position on the copyboard of a foreign object stuck on the copyboard before the original document conveyance portion conveys an original document; deciding a determination pixel to be used for determination from a plurality of pixels included in each of a plurality of scanned data output by the in-line correction portion while an original document is passing through the scanning position, based on a position detected by the position detection step; and determining whether an original document is color or black-and-white based on the decided determination pixel of each of the plurality of scanned data.

In accordance with this aspect, it is possible to provide a color determination method with improved accuracy. The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a block diagram showing a configuration of a color correction portion.

DESCRIPTION OF THE PREFERRED EMBODIMENTS

Figure 1:
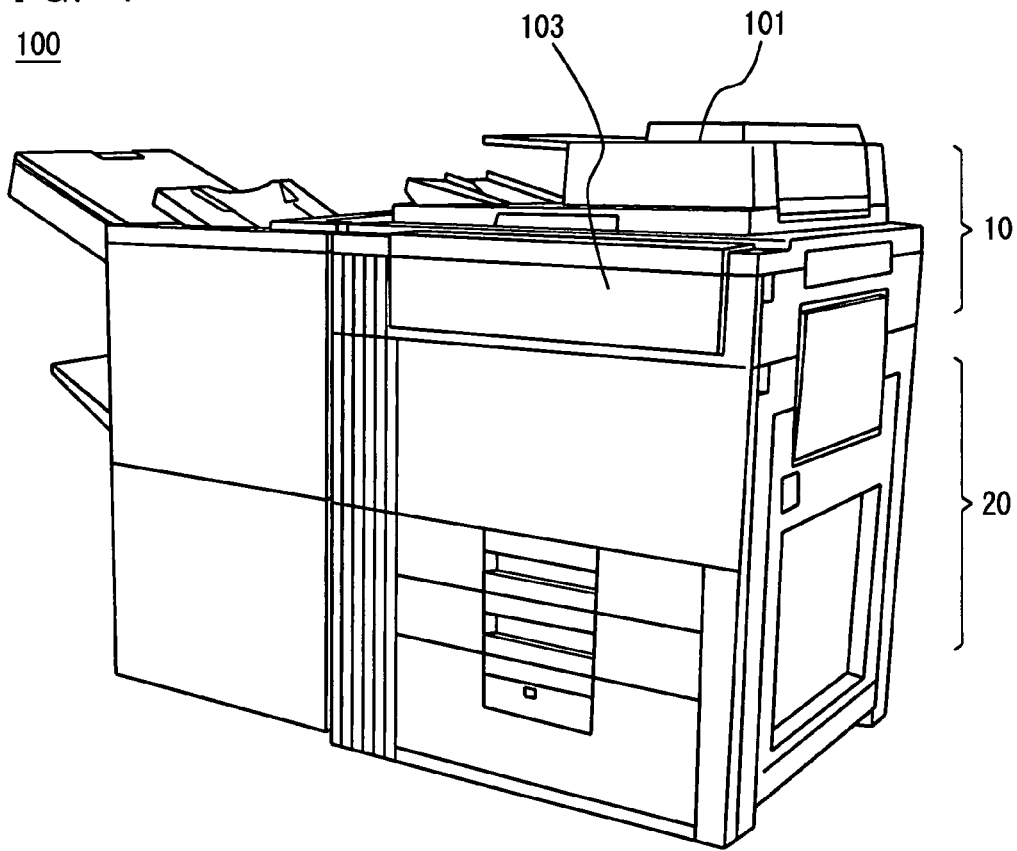
FIG. 1 is a perspective view of an MFP in accordance with an embodiment of the present invention.

An embodiment of the present invention will be described below with reference to the drawings. In the following description, the same or corresponding parts are denoted by the same reference characters. Their names and function are also the same. Thus, a detailed description thereof will not be repeated.

FIG. 1 is a perspective view of an MFP (Multi Function Peripheral) according to one embodiment of the present invention. With reference to FIG. 1, an MFP 100 includes an image scanning apparatus 10 for scanning an original document and an image forming apparatus 20 provided below image scanning apparatus 10. Image scanning apparatus 10 is partially housed in a body portion 103 and is provided with an automatic document feeder device (ADF) 101. Image forming apparatus 20 is housed below image scanning apparatus 10 in body portion 103 and forms an image on recording media such as paper based on the image data output by image scanning apparatus 10 scanning the original document. MFP 100 is provided with a communication interface for establishing connection with a facsimile and a network such as a local area network (LAN) and Public Switched Telephone Network (PSTN).

Figure 2:
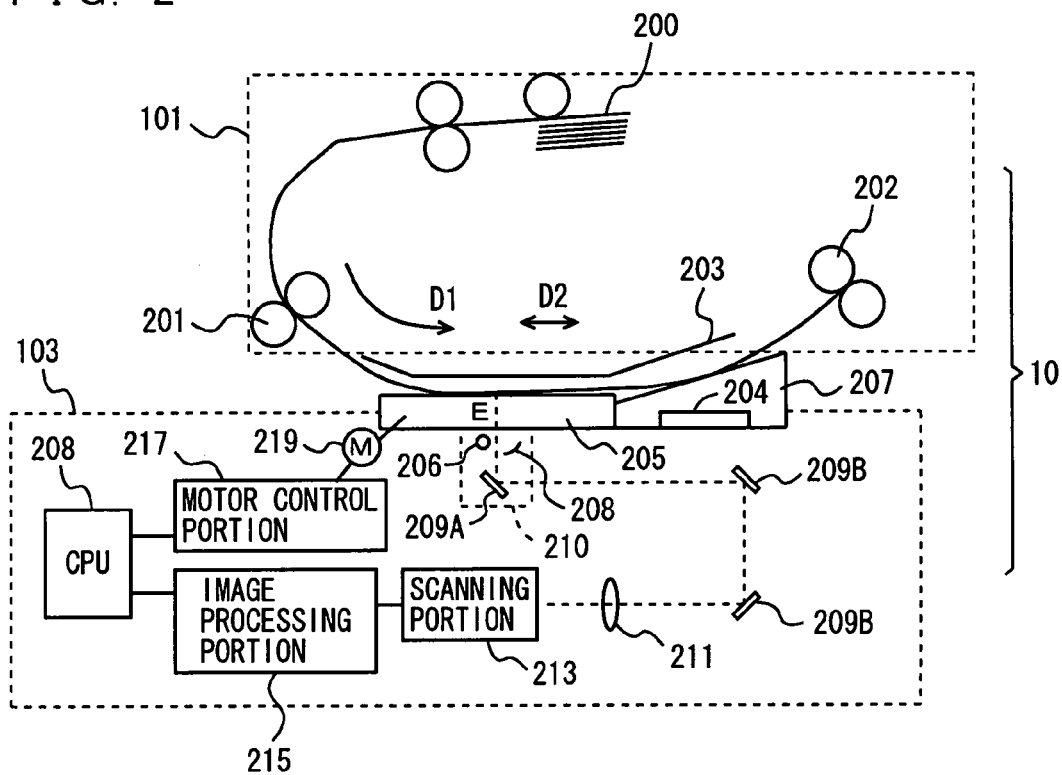
FIG. 2 is a schematic representation of an internal configuration of an image scanning apparatus.

FIG. 2 is a schematic representation of the internal configuration of image scanning apparatus 10. ADF 101 is provided with a timing roller pair 201 for conveying an original document 200 to a document scanning position E, an upper restricting board 203 for guiding the conveyance of the original document in the vicinity of document scanning position E, and a roller pair 202 for conveying original document 200 that passed through document scanning position E so as to discharge original document 200.

ADF 101 takes one sheet of the original document from the top of a plurality of original documents 200 loaded, and feeds it to timing roller pair 201. Thus, ADF 101 conveys a plurality of original documents 200 to document scanning position E one by one.

The portion of image scanning apparatus 10 being housed in body portion 103 includes a copyboard 205 formed of a transparent member, a paper passage guide 207 forming a portion of a conveyance route for an original document, a shading board 204 provided below paper passage guide 207, a light source 206 for emitting light, a reflection member 208 for reflecting the light from the light source, a scanning portion 213 having three line sensors aligned in a sub-scanning direction, reflection mirrors 209A, 209B reflecting and guiding the reflected light from the original document to scanning portion 213, a lens 211 for focusing the reflected light from reflection mirrors 209A, 209 B on scanning portion 213, an image processing portion 215 for processing image data output by scanning portion 213, a motor 219 allowing copyboard 205 to oscillate, and a motor control portion 217 to control driving of motor 219 based on control data from image processing portion 215.

Original document 200 is conveyed in a direction of an arrow D1 between copyboard 205 and upper restricting board 203 by timing roller pair 201. Then, as the original document is conveyed, the image of the original document is scanned at document scanning position E by scanning portion 213. The direction in which ADF 101 conveys the original document is the sub-scanning direction at document scanning position E. Motor control portion 217 drives motor 219 during the image scanning operation and allows copyboard 205 to oscillate in the directions of arrow D2. The direction of the oscillation of copyboard 205 is substantially parallel to the sub-scanning direction.

A slider 210 holds light source 206, reflection member 208 and reflection mirror 209A. Slider 210 can be reciprocated in the direction D2 in the figure, stops at the position below document scanning position E during scanning of an original document, and stops the position below shading board 204 before scanning of an original document. Reflection mirror 209B is moved with the movement of slider 210, so that the optical length of the reflected light can be kept substantially uniform.

When slider 210 is located at the position below document scanning position E, the light emitted by light source 206 is applied to original document 200 while ADF 101 conveys original document 200 to document scanning position E, in other words, while original document 200 passes through document scanning position E, and it is applied to upper restricting board 203 before the original document is scanned when ADF 101 does not convey original document 200 to document scanning position E. Upper restricting board 203 is colored in a uniform density. Preferably, upper restricting board 203 is achromatic, more preferably of an intermediate color of achromatic color (gray). The light emitted by light source 206 is partially reflected at original document 200 when an original document is at document scanning position E, and reflected at upper restricting board 203 when an original document is not at document scanning position E, and then reflected at reflection mirrors 209A, 209B and introduced to lens 211. Lens 211 collects the incident light beams to focus on each line sensor of scanning portion 213. When slider 210 is located at the position below shading board 204, the light emitted by light source 206 is applied to shading board 204. The light emitted by light source 206 is partially reflected at shading board 204 and then reflected at reflection mirrors 209A, 209B and introduced to lens 211. Lens 211 collects the incident light beams to focus on each line sensor of scanning portion 213.

Scanning portion 213 is provided with three line sensors. Each of the three line sensors includes a plurality of photoelectric transducers aligned in a main scanning direction that is substantially perpendicular to the sub-scanning direction. The three line sensors respectively have filters of different spectral sensitivities. The light reflected from the original document is transmitted through the filters and received by the plurality of photoelectric transducers. More specifically, the three line sensors have filters that transmit light of respective wavelengths of red (R), green (G), and blue (B), respectively. Thus, the line sensor having a red (R) filter outputs R data that indicates the intensity of a red light from the light reflected from the original document, the line sensor having a green (G) filter outputs G data that indicates the intensity of a green light from the light reflected from the original document, and the line sensor having a blue (B) filter outputs B data that indicates the intensity of a blue light from the light reflected from the original document.

The three line sensors are disposed in a predetermined order spaced by a prescribed distance in the sub-scanning direction. Here, they are disposed in the order of red, green, and blue in the direction of conveyance of the original document at intervals of a distance of three lines in terms of scanned lines of the original document. Moreover, the spacing and the order in which the three line sensors are disposed are not limited to the above.

Since the three line sensors are disposed in the order of red, green, and blue spaced at the distance of three lines, the three line sensors simultaneously receive lights reflected at different locations of the original document. Therefore, the light reflected at a certain location of the original document is first received by the line sensor receiving the red light, and then after the original document is conveyed the distance of three lines, received by the line sensor receiving the green light, and then after the original document is further conveyed the distance of three lines, received by the line sensor receiving the blue light. This delay is adjusted by image processing portion 215 which will be described later.

In addition, although three line sensors are provided in scanning portion 213 according to this embodiment, more than three line sensors may be provided.

Figure 3:
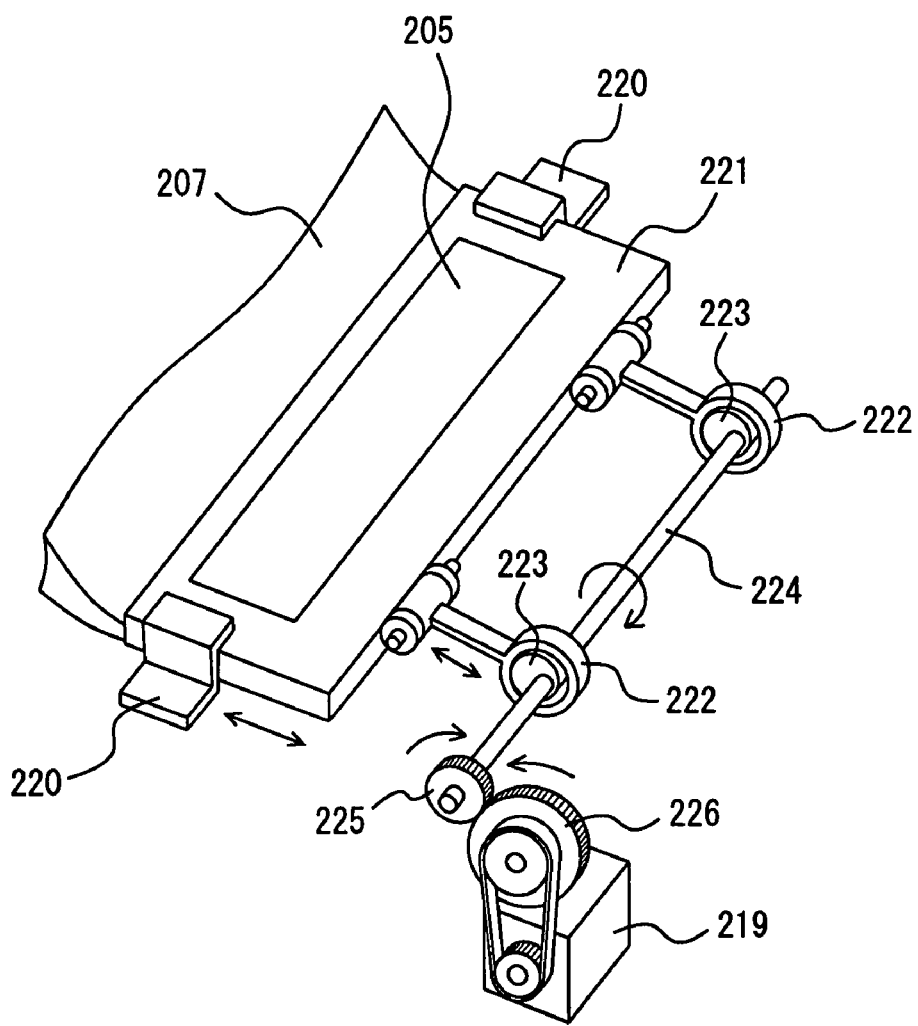
FIG. 3 is a perspective view illustrating a mechanism to allow a copyboard to oscillate.

FIG. 3 is a perspective view illustrating a mechanism to allow a copyboard to oscillate. With reference to FIG. 3, copyboard 205 is held by a copyboard holder 221. Copyboard holder 221 is held by a guide 220 such that it is slidable in the sub-scanning direction. Guide 220 is fixed to the body of image scanning apparatus 10. Two arms 222 are joined to one face of copyboard holder 221. Each arm 222 has a circular hole at the other end.

Two cams 223 are attached to a shaft 224 in positions corresponding to the two arms 222. Moreover, a gear 225 is attached at one end of shaft 224. Gear 225 is arranged such that it engages a gear 226 which is joined by a belt to a drive shaft of motor 219. When motor 219 rotates, the rotation is transmitted via the belt to gear 226, and gear 226 rotates. As gear 226 rotates, gear 225 and shaft 224 rotate. Cams 223 are disposed within the circular holes provided in arms 222. Consequently, the rotational movement of two cams 223 that accompanies the rotation of shaft 224 is converted into a reciprocating motion of copyboard holder 221. In addition, the mechanism to allow copyboard 205 to oscillate is not limited to this, and may also be a mechanism using a drive source that produces a linear motion such as a piston that utilizes an electromagnet, air pressure, hydraulic pressure and the like, for instance.

Copyboard 205 oscillates parallel to the sub-scanning direction. While copyboard 205 moves in the direction opposite to the direction in which the original document is conveyed, copyboard 205 and the original document move in opposite directions so that the relative speed of copyboard 205 with respect to the line sensors differs from the relative speed of the original document with respect to the line sensors. On the other hand, while copyboard 205 moves in the direction of conveyance of the original document, the speed of copyboard 205 and the conveyance speed of the original document are identical in direction. It is preferred to vary the speed. In addition, although copyboard 205 is made to oscillate parallel to the sub-scanning direction here, the direction is not thus limited.

Now, the principle on which a pixel of a chromatic color is included in image data when image scanning apparatus 10 in accordance with the present embodiment scans a black-and-white document in a state in which a foreign object is stuck on copyboard 205. First, in-line correction will be described. FIG. 4 is a diagram illustrating the principle on which a pixel of a chromatic color is included in image data when a black-and-white document is scanned in a state in which a foreign object is stuck on the copyboard. Here, the original document and copyboard 205 are conveyed in the direction of an arrow in the drawing, and the moving speed of copyboard 205 is set to be identical in direction to and twice as fast as the speed of conveyance of the original document. Moreover, it is assumed that the three line sensors, in the order of a line sensor receiving the red light, a line sensor receiving the green light, and a line sensor receiving the blue light, are disposed in the direction of conveyance of the original document at intervals of a distance of three lines. In addition, an output of the line sensor receiving the red light is indicated by R, an output of the line sensor receiving the green light is indicated by G, and an output of the line sensor receiving the blue light is indicated by B.

Figure 4A:
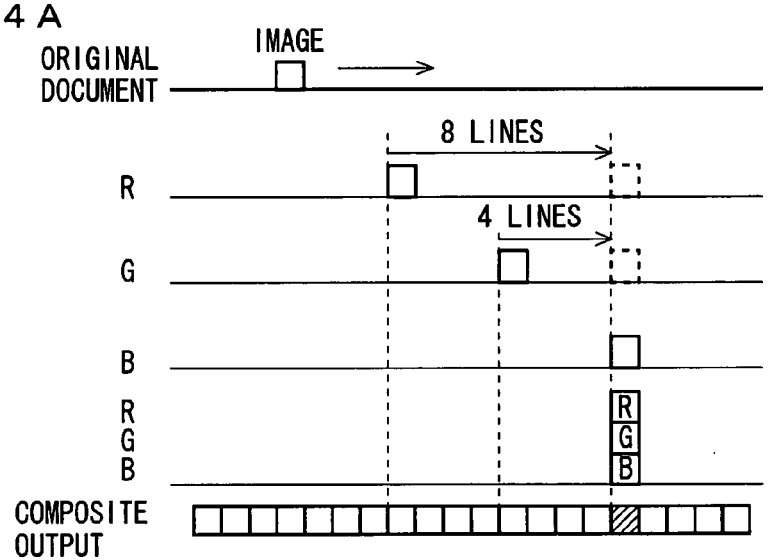
FIGS. 4A to 4C are diagrams for illustrating a principle of inclusion of a chromatic pixel in image data when a black-and-white original document is scanned with a foreign object stuck on the copyboard.

FIG. 4A is a diagram for illustrating the in-line correction. With reference to FIG. 4A, the original document is conveyed in the direction of the arrow in the drawing. An image of a portion of the original document is first scanned by the line sensor receiving the red light disposed farthest upstream in the direction of conveyance of the original document. Then, the same portion of the original document is conveyed for a distance of four lines and the image of the same portion of the original document is scanned by the line sensor receiving the green light. Further, the same portion of the original document is conveyed for the distance of four lines and the image thereof is scanned by the line sensor receiving the blue light.

In this manner, since the image of a certain portion of the original document is scanned by three line sensors at different times, the three data simultaneously output by the three line sensors are data output by scanning different parts of the original document. In the in-line correction, the output timing of three data output by the three line sensors is adjusted such that the output data become data that are output by the three line sensors respectively scanning the same portion of the original document. More specifically, an output R is delayed by eight lines, and an output G is delayed by four lines. A composite output is the output obtained by compositing in-line corrected output R, output G, and output B.

Figure 4B:
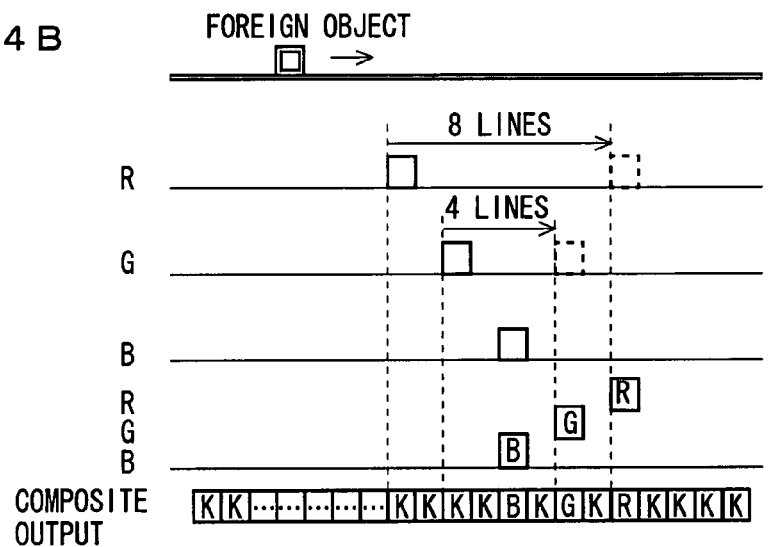

FIG. 4B is a diagram for describing the composite output that is output when a foreign object stuck on the copyboard is scanned. The foreign object stuck on copyboard 205 is first scanned by the line sensor receiving the red light disposed farthest upstream in the direction of conveyance of the original document. Then, the foreign object is conveyed for a distance of four lines and scanned by the line sensor receiving the green light. Here, copyboard 205 moves at twice the speed and in the same direction with respect to the speed of conveyance of the original document so that the foreign object moves the distance of four lines during the time in which a line sensor scans two lines of the original document. Consequently, there is a lag of time for scanning of two lines between the time point at which the red line sensor scans the foreign object and the time point at which the green line sensor scans the foreign object. Further, the foreign object is conveyed for the distance of four lines and scanned by the line sensor receiving the blue light. Copyboard 205 moves at twice the speed and in the same direction with respect to the speed of conveyance of the original document so that there is a lag of time for scanning of two lines between the time point at which the green line sensor scans the foreign object and the time point at which the blue line sensor scans the foreign object.

Then, by the in-line correction, output R output by the line sensor receiving the red light scanning the foreign object is delayed by eight lines, and output G output by the line sensor receiving the green light scanning the foreign object is delayed by four lines. Thus, in the composite output obtained by compositing output R, output G, and output B in-line corrected, output R, output G, and output B, respectively obtained by scanning the foreign object, are not of the same line but are shifted by two lines.

Moreover, the diagram shows the composite output in the case where a white-colored foreign object such as paper dust is stuck on copyboard 205 and a black-colored original document is being scanned. In this case, although a white-colored foreign object is scanned, the composite output becomes an output of blue, green, and red separated into three lines. In this manner, a foreign object stuck on copyboard 205 is divided into a plurality of lines within the image. Thus, the noise generated by scanning the foreign object is reduced in comparison to the case where the scanning is performed without moving copyboard 205.

Figure 4C:
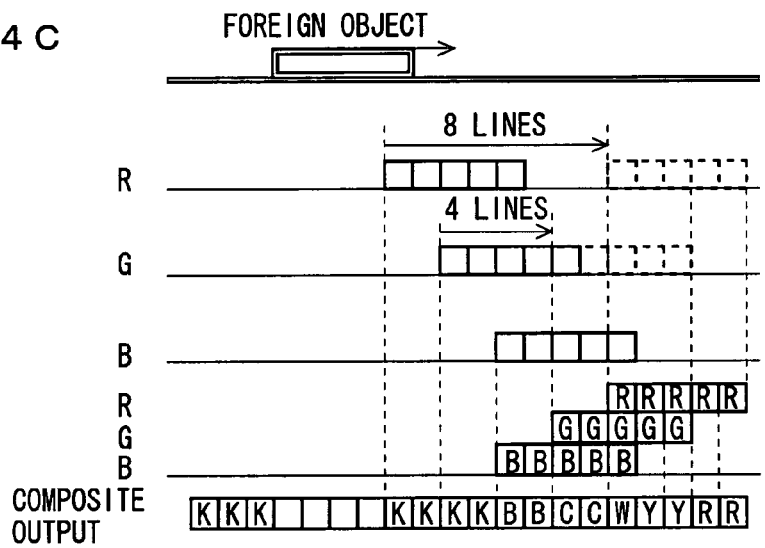

FIG. 4C is another diagram for describing the composite output that is output when the foreign object stuck on the copyboard is scanned. FIG. 4C shows as an example the case where a foreign object of a size of ten lines in the sub-scanning direction is scanned. Copyboard 205 moves at twice the speed and in the same direction with respect to the speed of conveyance of the original document so that the foreign object is scanned as having the size of five lines.

The foreign object stuck on copyboard 205 is first scanned by the line sensor receiving the red light disposed farthest upstream in the direction of conveyance of the original document. Then, the foreign object is conveyed for the distance of four lines and scanned by the line sensor receiving the green light. There is a lag of time for scanning of two lines between the time point at which the red line sensor scans the foreign object and the time point at which the green line sensor scans the foreign object. Further, the foreign object is conveyed for the distance of four lines and scanned by the line sensor receiving the blue light. There is a lag of time for scanning of two lines between the time point at which the green line sensor scans the foreign object and the time point at which the blue line sensor scans the foreign object.

Then, by the in-line correction, output R output by the line sensor receiving the red light scanning the foreign object is delayed by eight lines, and output G output by the line sensor receiving the green light scanning the foreign object is delayed by four lines. Thus, in the composite output obtained by compositing output R, output G, and output B in-line corrected, output R of five lines obtained by scanning the foreign object, output G of five lines obtained by scanning the foreign object, and output B of five lines obtained by scanning the foreign object are not of the same line but are shifted by two lines. Moreover, the diagram shows the composite output in the case where a white-colored foreign object such as paper dust is stuck on copyboard 205 and a black-colored original document is being scanned. In this case, although a white-colored foreign object is scanned, the composite output becomes an output of colors that change from blue, to cyan, to white, to yellow, and to red in this order.

In this manner, the foreign object stuck on copyboard 205 is divided into a plurality of lines within the image, so that a pixel of a chromatic color is included in image data. In addition, division of the foreign object into a plurality of lines in the image reduces the noise generated by scanning the foreign object.

Figure 5:
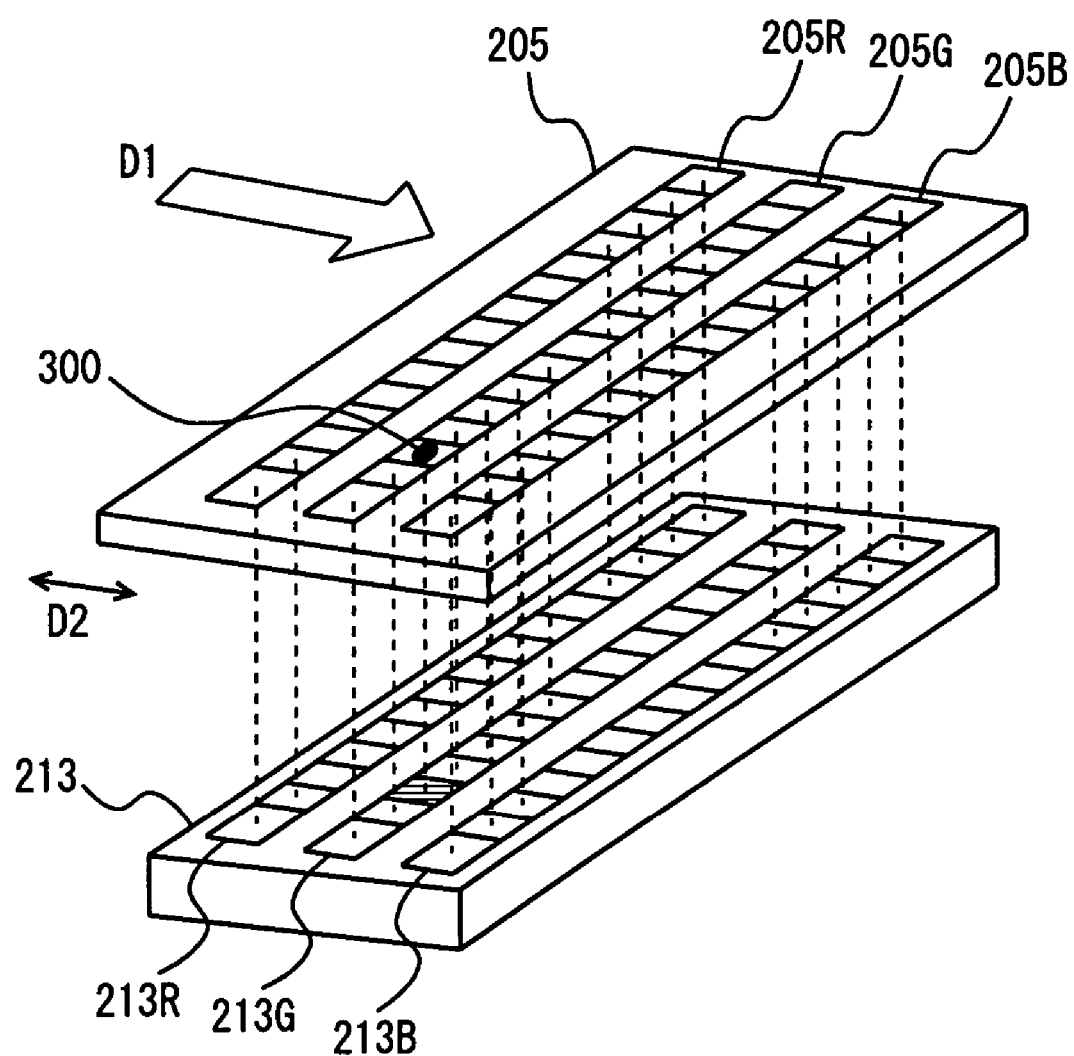
FIG. 5 is a diagram showing a scanning region on the copyboard to be scanned by a scanning portion.

FIG. 5 is a diagram showing a scanning region on copyboard 205 to be scanned by scanning portion 213. Scanning portion 213 includes a line sensor 213R having a red (R) filter, a line sensor 213G having a green (G) filter, and a line sensor 213B having a blue (B) filter. Line sensors 213R, 213G, and 213B are disposed in a direction of conveyance D1 of the original document in the order of line sensors 213R, 213G, and 213B.

Line sensor 213R receives the light that transmitted through a region 205R of copyboard 205. Line sensor 213G receives a light that transmitted through a region 205G of copyboard 205. Line sensor 213B receives the light that transmitted through a region 205B of copyboard 205. Line sensors 213R, 213G, and 213B are disposed such that regions 205R, 205G, and 205B have a spacing of three lines. The original document first passes through region 205R, and then passes through region 205G, and finally passes through region 205B. Therefore, the light reflected at a certain location of the original document is first received by line sensor 213R receiving the red light, and thereafter received by line sensor 213G receiving the green light, and finally received by line sensor 213B receiving the blue light. Line sensors 213R, 213G, and 213B are disposed at intervals of the distance of three lines so that line sensors 213R, 213G, and 213B never simultaneously receive the light reflected at the same location of the original document.

Here, it is assumed that a foreign object 300 having a length of four lines or less is stuck on copyboard 205. In this case, copyboard 205 moves in oscillation parallel to the sub-scanning direction so that foreign object 300 never simultaneously exists in more than one of regions 205R, 205G, and 205B. FIG. 5 shows the case where foreign object 300 exists in region 205G. In this case, the light reflected by foreign object 300 is received only by line sensor 213G and is not received by line sensors 213R and 213B.

In addition, since copyboard 205 oscillates, there are a case in which copyboard 205 moves in the direction of conveyance D1 of the original document and a case in which copyboard 205 moves in the direction opposite to the direction of conveyance D1 of the original document. While copyboard 205 moves in the direction of conveyance D1 of the original document, the foreign object moves first to region 205R, then to region 205G, and finally to region 205B in this order. Conversely, while copyboard 205 moves in the direction opposite to the direction of conveyance D1 of the original document, the foreign object moves first to region 205B, then to region 205G, and finally to region 205R in this order. Therefore, while copyboard 205 moves in the direction of conveyance D1 of the original document, the light reflected by foreign object 300 is first received by line sensor 213R, then by line sensor 213G, and finally by line sensor 213B. Moreover, while copyboard 205 moves in the opposite direction to the direction of conveyance D1 of the original document, the light reflected by foreign object 300 is first received by line sensor 213B, then by line sensor 213G, and finally by line sensor 213R.

While copyboard 205 moves in the direction of conveyance of the original document, the noise due to scanning of the foreign object appears first in R data output by line sensor 213R, then in G data output by line sensor 213G, and finally in B data output by line sensor 213B in this order. In addition, while copyboard 205 moves in the direction opposite to the direction of conveyance of the original document, the noise due to scanning of the foreign object appears first in B data output by line sensor 213B, then in G data output by line sensor 213G, and finally in R data output by line sensor 213R in this order. In other words, the order of the data in which the noise generated by scanning the foreign object appears is determined by the direction of movement of copyboard 205.

Figure 6:
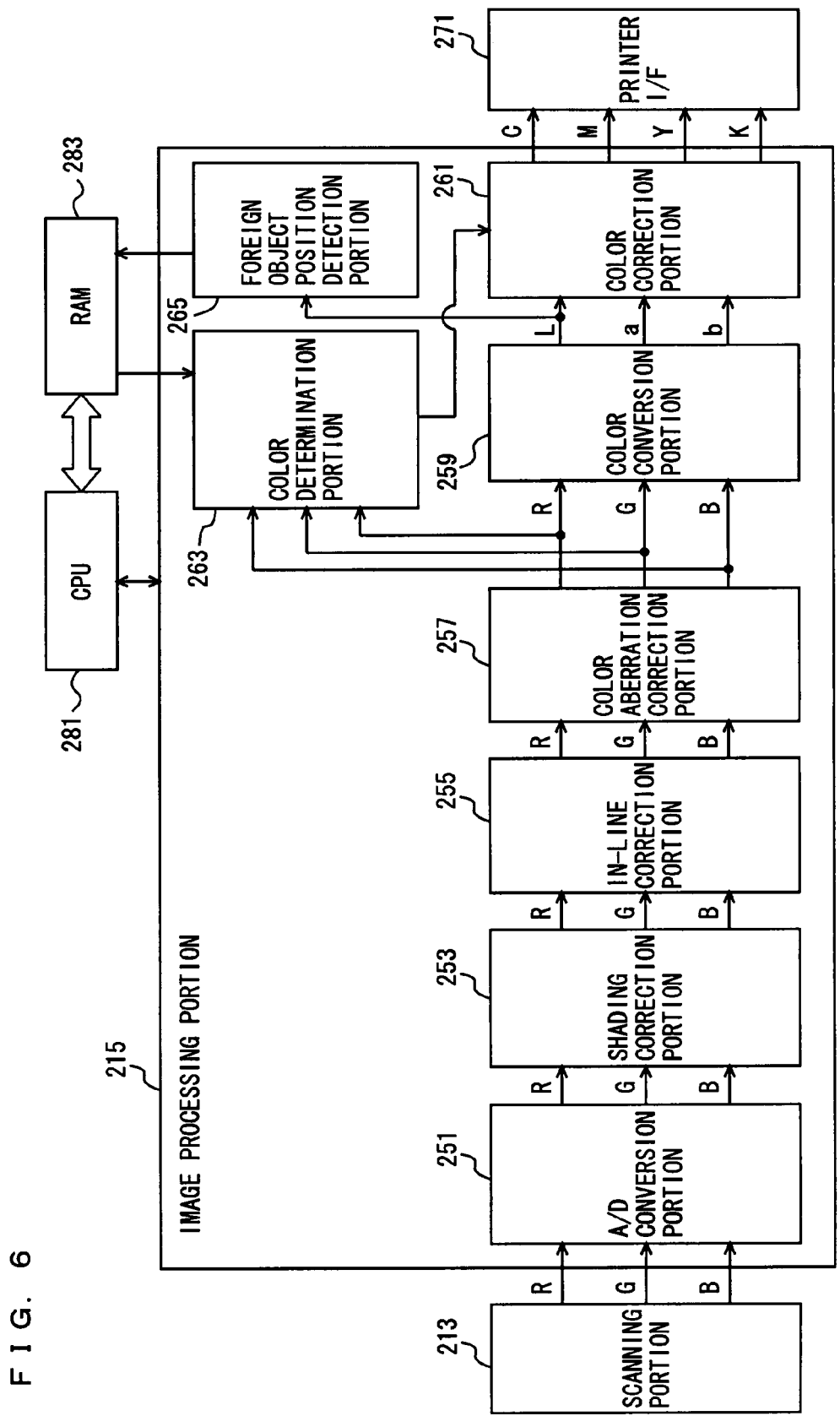
FIG. 6 is a functional block diagram schematically showing a function of an image scanning apparatus of MFP.

FIG. 6 is a functional block diagram schematically showing a function of image scanning apparatus 10 of MFP. Referring to FIG. 6, image scanning apparatus 10 includes a Central Processing Unit (CPU) 281 for controlling the entire MFP 100, an RAM (Random Access Memory) 283 for storing foreign object position data and scanned data as a work area for CPU 281, a scanning portion 213, an image processing portion 215 controlled by CPU 281, and a printer interface (I/F) 271.

Image processing portion 215 is connected to scanning portion 213 to receive R data, G data, B data from scanning portion 213. Image processing portion 215 includes an analog-to-digital converter (A/D conversion portion) 251 for converting R data, G data, and B data of analog signals input from scanning portion 213 into digital signals, a shading correction portion 253 for correcting the unevenness of illumination and the like of light source 206, an in-line correction portion 255, a chromatic aberration correction portion 257 for correcting the distortion in the main scanning direction due to lens 211, a color determination portion 263 for determining whether an original document is color or black-and-white based on R data, G data, B data, a color conversion portion 259 for converting R data, G data, B data from RGB calorimetric system to Lab calorimetric system, a foreign object position detection portion 265 for detecting a position of a foreign object based on lightness data L, and a color correction portion 261 for converting Lab colorimetric system into CMY calorimetric system. Image processing portion 215 is connected to printer I/F 271 and outputs C data of cyan, M data of magenta, Y data of yellow and K data of black to printer I/F 271 in the case of a colored document and outputs only K data in the case of a black-and-white document. Accordingly, image forming apparatus 20 forms an image based on CMYK data in the case of a colored document and forms an image based on K data in the case of a black-and-white document.

In-line correction portion 255 delays R data by eight lines and G data by four lines. Thus, R data, G data, and B data output by line sensors 213R, 213G, and 213B scanning an original document are synchronized such that they correspond to the same line of the original document. This is because line sensors 213R, 213G, and 213B are arranged at intervals of the distance of three lines in the sub-scanning direction, as described above.

Figure 7:
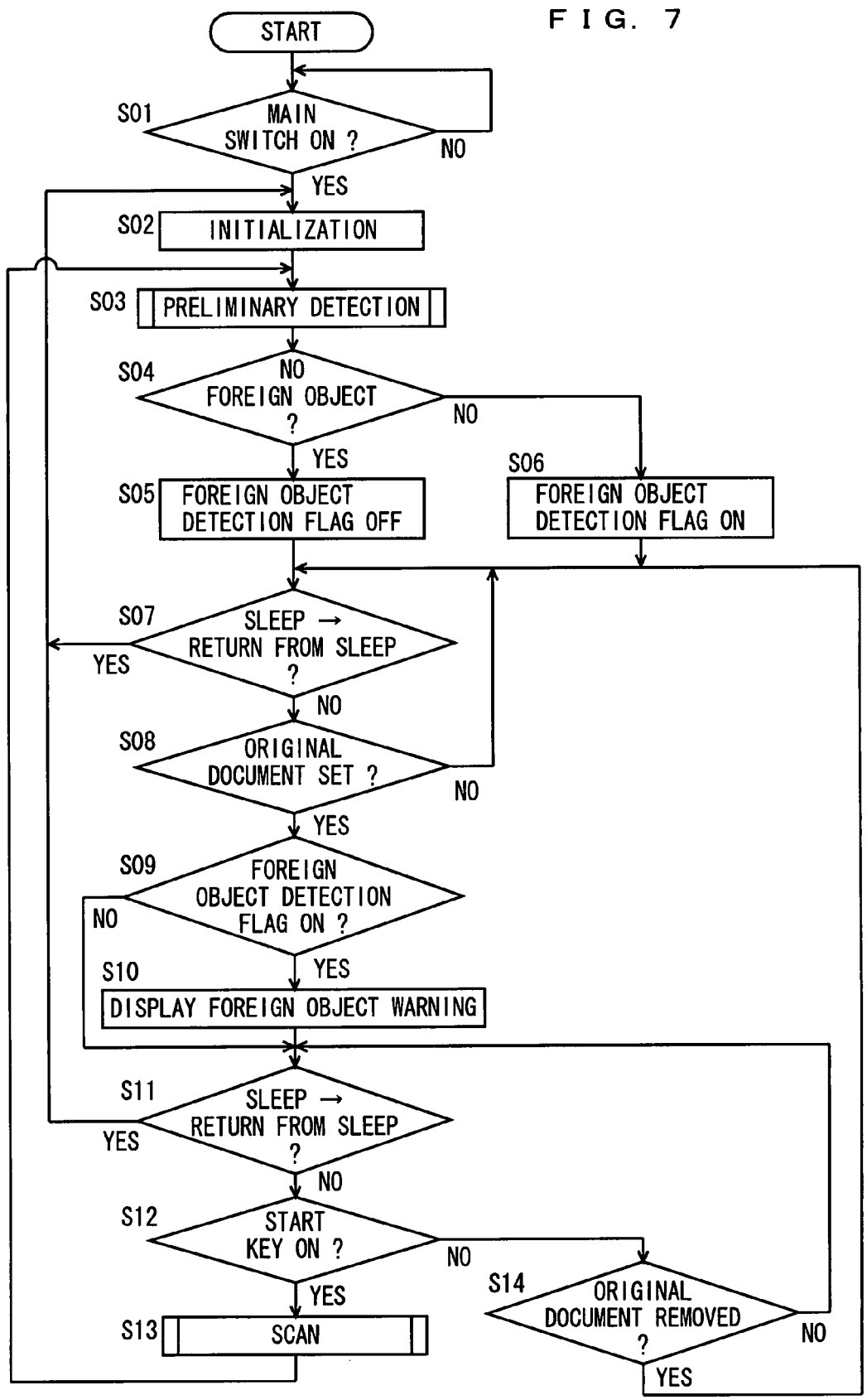
FIG. 7 is a flowchart illustrating an exemplary flow of a main process executed in CPU.

FIG. 7 is a flowchart illustrating an exemplary flow of a main process performed in CPU. Referring to FIG. 7, CPU 281 detects whether or not the main switch of MFP 100 is ON (step S01). If it is detected that the switch is ON, the process proceeds to step S02, and if not ON, the process enters the standby state. At step S02, image scanning apparatus 10 is initialized. The initialization includes gain/clamp adjustment, shading correction, and the like. Thereafter, a preliminary detection process is performed (step S03). The preliminary detection process, which will be described later, includes a process of detecting whether or not a foreign object is stuck on copyboard 205 and, if a foreign object is stuck, a process of detecting a position of the foreign object in copyboard 205. As a result of the preliminary detection process, if a foreign object is not stuck (YES at step S04), CPU 281 proceeds to step S05. If a foreign object is stuck, the process proceeds to step S06. At step S05, a foreign object detection flag indicative of whether or not a foreign object is stuck on copyboard 205 is set OFF to indicate that no foreign object is stuck. At step S06, the foreign object detection flag is set ON to indicate that a foreign object is stuck.

Then, CPU 281 determines whether or not MFP 100 returns from a sleep state where power consumption is saved (step S07). If MFP 100 returns from the sleep state, the process returns to step S02. If not, the process proceeds to step S08. The sleep mode is a mode to which transition takes place when no operation is input to MFP 100 for a prescribed time. If an input of any operation is detected, for example, when it is detected that a document is set in ADF 101, MFP 100 returns from the sleep mode. The process returns to step S02 when MFP 100 returns from the sleep mode, because MFP 100 enters the sleep mode after the expiration of a prescribed time, during which a foreign object may be stuck on copyboard 205.

At step S08, it is determined whether or not an original document is set in ADF 101. If an original document is set, the process proceeds to step S09. If no original document is set, the process returns to step S07. The processes after step S09 are performed on condition that an original document is set in ADF 101.

At step S09, CPU 281 determines the state of the foreign object detection flag. If the foreign object detection flag is set ON, the process proceeds to step S10. If set OFF, step S10 is skipped and the process proceeds to step S11. At step S10, a warning message indicating that a foreign object is stuck is displayed on the operation panel provided on the upper surface of MFP 100 to give the user a warning. Then, the process proceeds to step S11.

At step S11, CPU 281 determines whether or not MFP 100 returns from the sleep state, similarly to step S07. If returning from the sleep state, the process returns to step S02. If not, the process proceeds to step S12. This is because a prescribed time or longer has passed since the original document was set, during which a foreign object may be stuck on copyboard 205. In addition, the user who looks at the warning message may clean up copyboard 205 to remove the foreign object. At step S12, it is determined whether or not the start key of the operation panel is turned ON. If it is detected that the start key is turned ON, the process proceeds to step S13. If it is not detected that the start key is turned ON, the process proceeds to step S14. At step S13, a scan process is performed and thereafter the process returns to step S03. The scan process will be described later. On the other hand, at step S14, it is determined whether or not the original document is removed from ADF 101. If the original document is removed, the process returns to step S07. If the original document is set, the process returns to step S11. In the detection that the document is removed, it is detected that no document is set in ADF 101.

Figure 8:
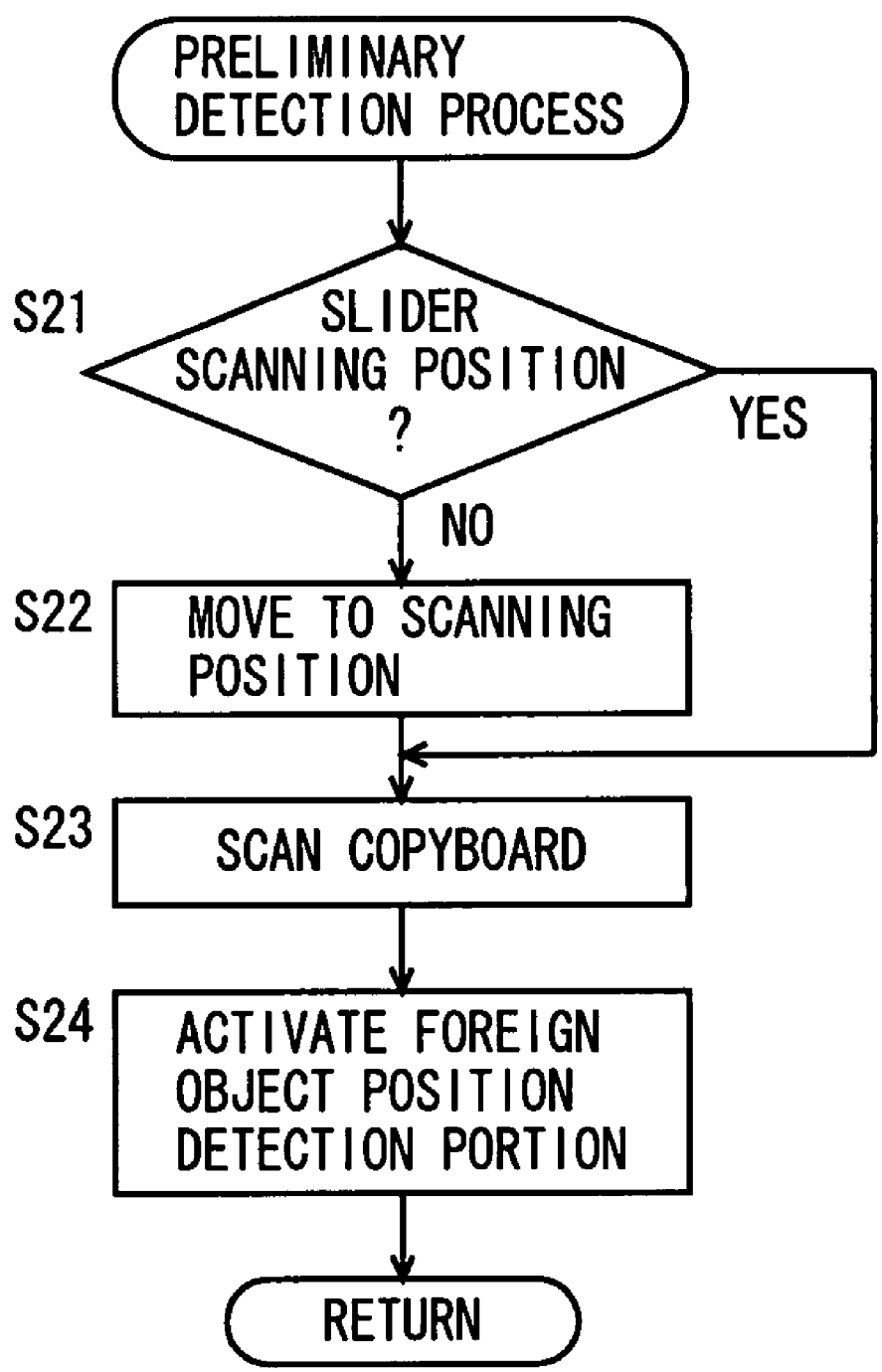
FIG. 8 is a flowchart illustrating an exemplary flow of a preliminary detection process.

FIG. 8 is a flowchart illustrating an exemplary flow of the preliminary detection process. Referring to FIG. 8, CPU 281 determines whether or not slider 210 is located below the document scanning position E (step S21). If located below the document scanning position E, the process proceeds to step S23. If not, the process proceeds to step S22. At step S22, slider 210 is moved to below document scanning position E. This is because in the preliminary detection process, light is applied from light source 206 to upper restricting board 203, from which reflected light is scanned by scanning portion 213.

Then, CPU 281 scans copyboard 205 (step S23). Here, CPU 281 controls motor control portion 217 to move copyboard 205. The moving speed and the moving distance are the same as the speed and the moving distance for moving copyboard 205 when ADF 101 conveys an original document. Since copyboard 205 is formed of a transparent member, the light emitted from light source 206 is applied to upper restricting board 203, from which reflected light is scanned by scanning portion 213. However, if a foreign object is stuck on copyboard 205, when the foreign object is located at document scanning position E by moving copyboard 205, the light emitted from light source 206 is applied to the foreign object, from which reflected light is scanned by scanning portion 213. Therefore, if no foreign object is stuck on copyboard 205, data of achromatic color in a uniform density which is produced by scanning upper restricting board 203 is output from scanning portion 213. However, if a foreign object is stuck on copyboard 205, data having the color of the foreign object at the portion of the foreign object is output from scanning portion 213.

Then, CPU 281 activates foreign object position detection portion 265 (step S24), and the process ends. Foreign object position detection portion 265, which will be described later, receives lightness data L produced by color conversion of RGB data produced by scanning copyboard 205, detects a foreign object to generate foreign object position data, and stores the generated foreign object position data into RAM 283. Here, the lightness data L produced by color conversion of RGB data output by scanning portion 213 scanning copyboard 205 is referred to as detection data.

Figure 9:
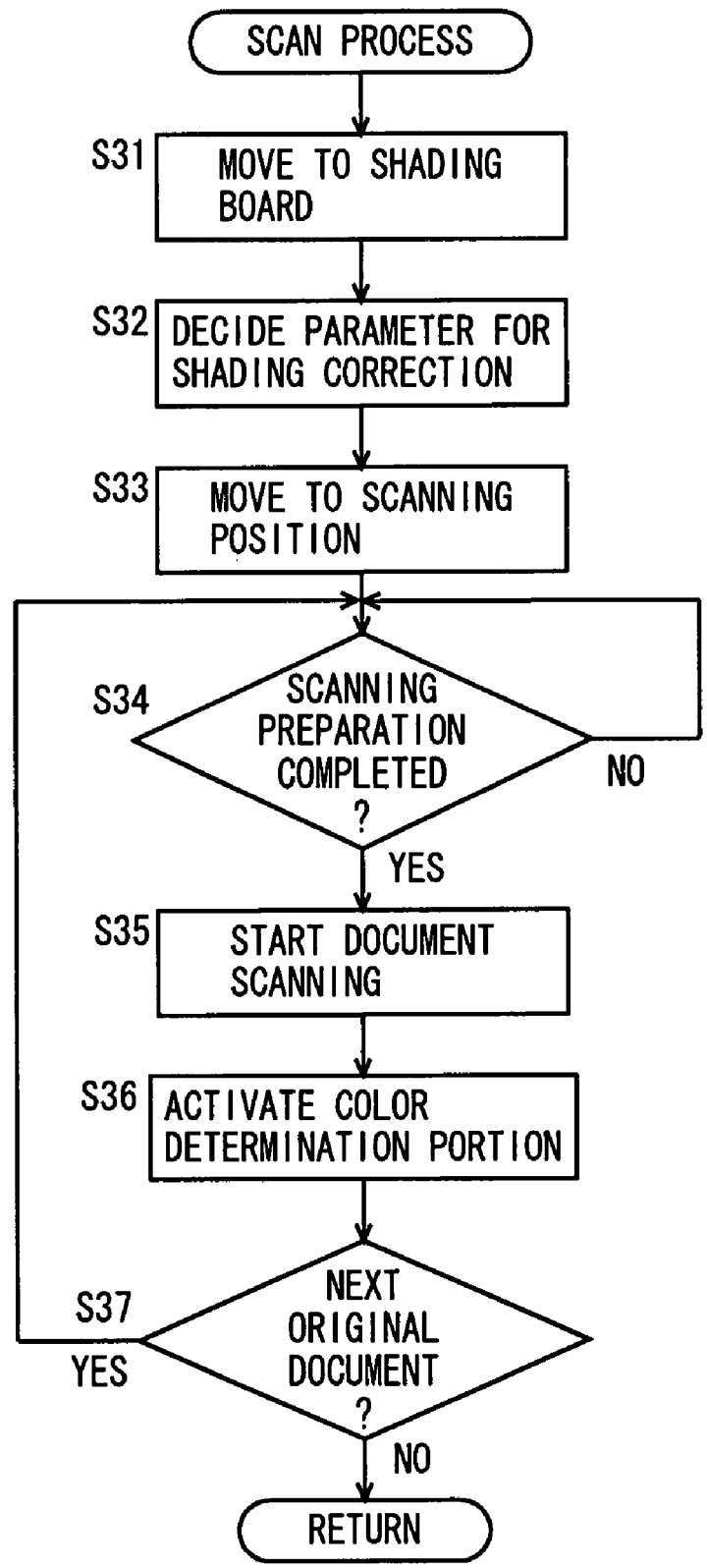
FIG. 9 is a flowchart illustrating an exemplary flow of a scan process.

FIG. 9 is a flowchart illustrating an exemplary flow of the scan process. Referring to FIG. 9, CPU 281 moves slider 210 to below shading board 204 (step S31). Then, shading board 204 is scanned so that a parameter for shading correction is determined (step S32). Slider 210 is moved to the position below document scanning position E (step S33).

Thereafter, CPU 281 determines whether or not a scanning preparation is completed (step S34) and enters the standby state until the scanning preparation is completed (NO at step S34). The scanning preparation is, for example, moving slider 210 to the position below document scanning position E. If the scanning preparation has been completed, scanning of an original document is started (step S35). Here, CPU 281 allows ADF 101 to start conveying original document 200 and controls motor control portion 217 to move copyboard 205. Then, CPU 281 activates color determination portion 263 (step S36). Color determination portion 263, which will be described later, receives RGB data produced by scanning original document 200 and determines whether original document 200 is color or black-and-white. Here, RGB data output by scanning portion 213 scanning original document 200 is called scanned data. Then, CPU 281 determines whether or not the next original document exists in ADF 101 (step S37). If exist, the process returns to step S34. If not, the process ends.

Figure 10:
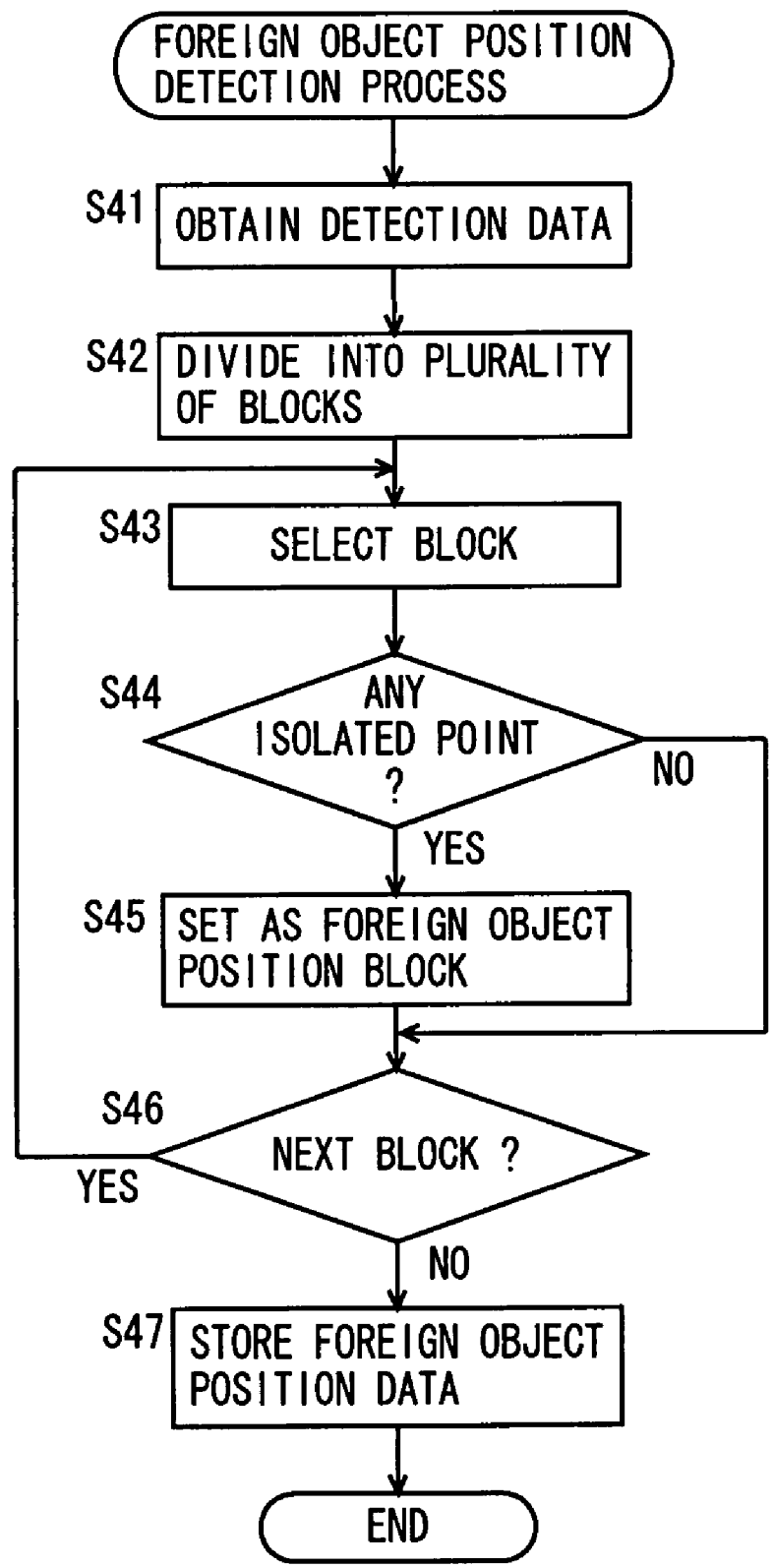
FIG. 10 is a flowchart illustrating a flow of a foreign object position detection process performed in a foreign object position detection portion.

FIG. 10 is a flowchart illustrating a flow of the foreign object position detection process performed in foreign object position detection portion 265. The foreign object position detection process is a process performed by foreign object position detection portion 265 when foreign object position detection portion 265 is activated by CPU 281. Referring to FIG. 10, foreign object position detection portion 265 obtains detection data (step S41) and divides the obtained detection data into a plurality of blocks (step S42). The detection data is lightness data L produced by color conversion of RGB data obtained by scanning copyboard 205 while moving copyboard 205, as described above. Here, the detection data is divided into 256 blocks in the main scanning direction and 32 blocks in the sub-scanning direction, by way of example. Foreign object position detection portion 265 has four RAMs (256×8 bits) where each of 256×32 blocks is associated with each bit. In the state where four RAMs are initialized, each bit stores 0.

Foreign object position detection portion 265 selects one of 256×32 blocks (step S43) and detects an isolated point based on a plurality of pixel values included in the selected block (step S44). The isolated point refers to a pixel having lightness different from the surrounding pixels. The isolated point may be of a single pixel or may be a set of a plurality of pixels. The detection of an isolated point is conducted by an isolated point detection filter process using an isolated point detection filter. The isolated point detection filter process is performed on all the pixels included in the block. If an isolated point exists in the selected block, foreign object position detection portion 265 proceeds to step S45. If an isolated point does not exist, step S45 is skipped and the process proceeds to step S46. If at least one of the pixels included in the selected block is an isolated point, foreign object position detection portion 265 determines that an isolated point exists. At step S45, the selected block is set as a foreign object position block indicating that a foreign object exists, and the process proceeds to step S46. Specifically, the foreign object position block is set by rewriting a bit corresponding to the selected block in four RAMs to "1".

At step S46, it is determined whether or not any block that has not yet been selected exists. If an unselected block exists, the process returns to step S43 and the next block is selected. If an unselected block does not exist, the process proceeds to step S47, and the foreign object position data in which a foreign object position block is set is stored in RAM 283. Specifically, the value of each bit in four RAMs of foreign object position detection portion 265 is copied to RAM 283.

Figures 11A, 11B:
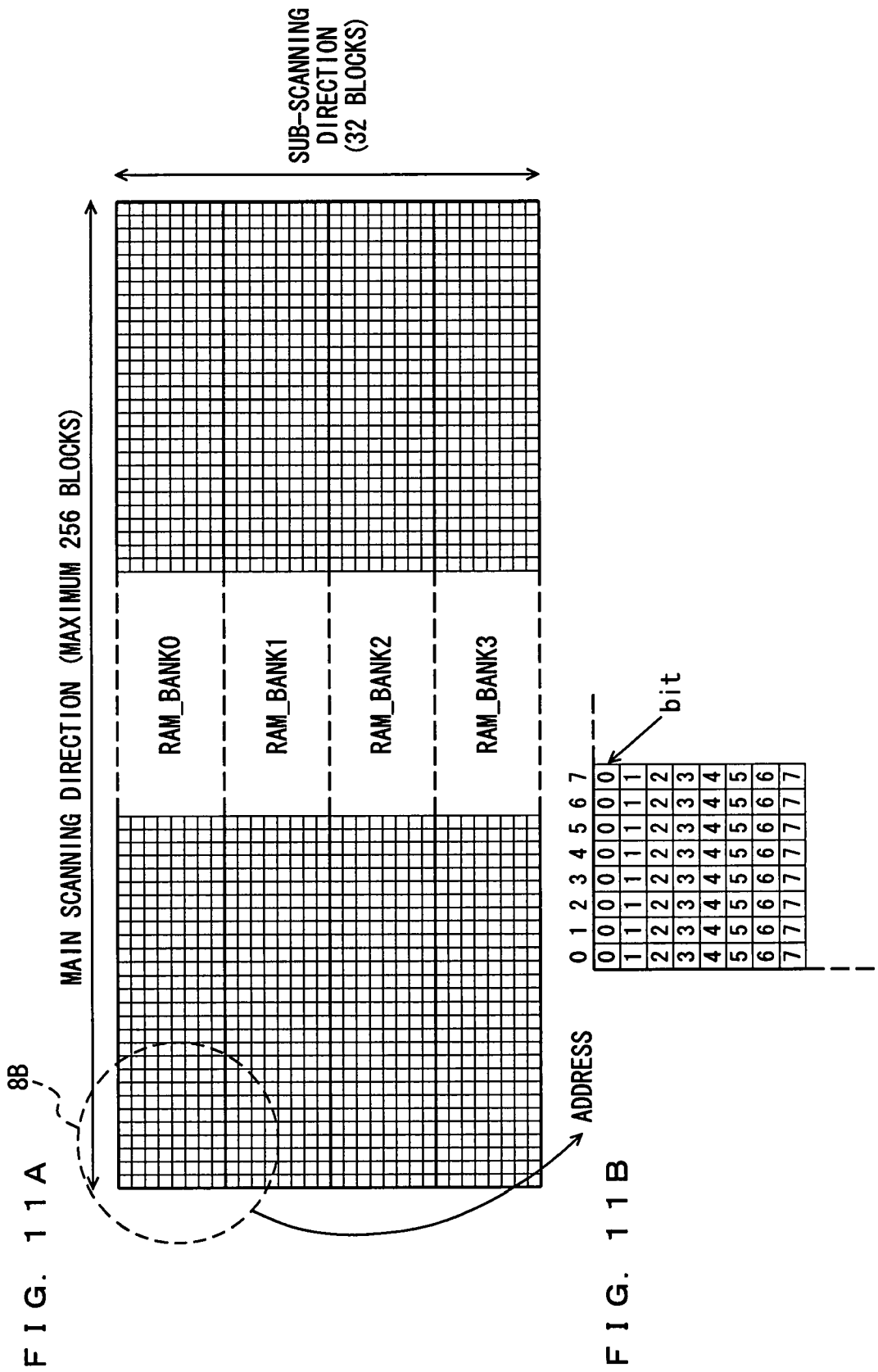
FIG. 11A is a diagram showing an exemplary configuration of four RAMs included in the foreign object position detection portion.
FIG. 11B is an enlarged diagram showing a partial storage region of four RAMs.

FIG. 11A is a diagram showing an exemplary configuration of four RAMs of the foreign object position detection portion. FIG. 11B is an enlarged diagram of storage region 8B of a part of four RAMs. Each of the four RAMs, namely, RAM_BANK0, RAM_BANK1, RAM_BANK2, RAM_BANK3 has a memory capacity of 256×8 bits where each bit corresponds to one of a plurality of blocks into which test data is divided as described above. In the FIG. 8B represents a storage region of addresses 0-7 of RAM_BANK0. For example, 1 byte at address 0 is associated with the first block in the main scanning direction and eight blocks from the first to the eighth block in the sub-scanning direction. Each bit of four RAMs is set to 1 if an isolated point exists in the corresponding block, and it is set to 0 if an isolated point does not exist.

Figure 12:
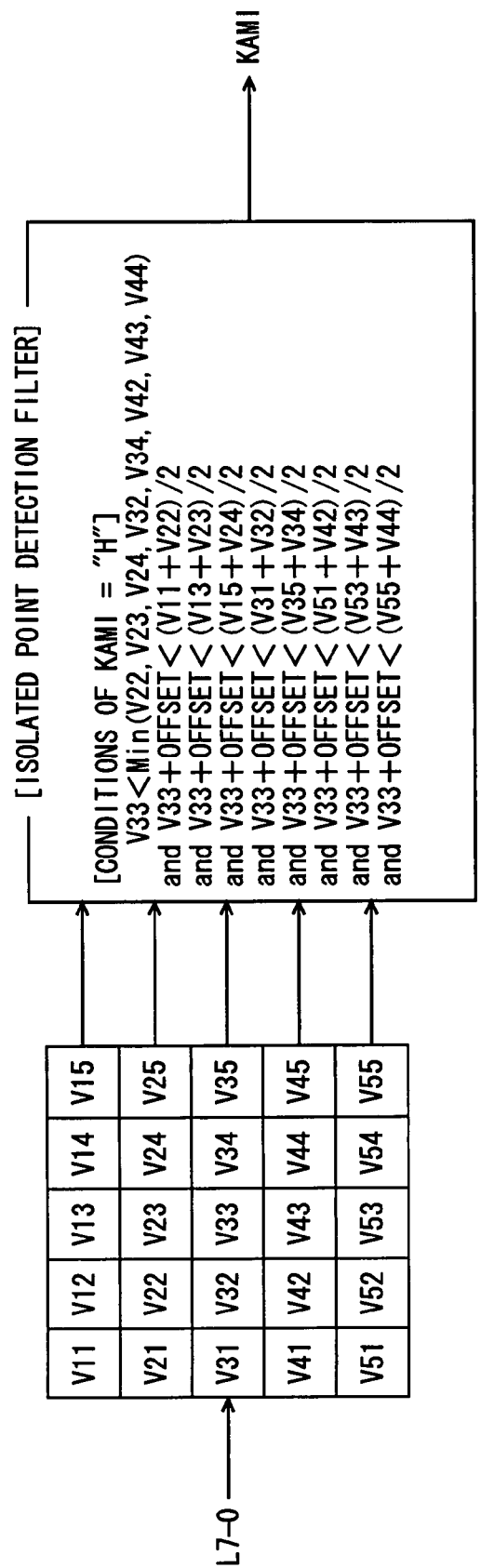
FIG. 12 is a diagram showing an exemplary isolated point detection filter.

FIG. 12 is a diagram showing an example of the isolated point detection filter. In FIG. 12, a black-colored isolated point having a size smaller than the size of 5×5 pixels can be detected. The isolated point detection filter is used to detect whether or not a target pixel is an isolated point based on the value of a target pixel of the detection data and the values of the surrounding 24 pixels. In the figures, the combination of a reference character V and a numeral represents the position of a pixel and a pixel value, and the pixel represented by V33 is a target pixel. Using the isolated point detection filter, it is detected that a target pixel is a black-colored isolated point, if all of the following conditions are met. If even one is not met, it is detected that a target pixel is not a black-colored isolated point. The isolated point detection filter outputs an output signal KAMI having a value of 1, if the target pixel is a black-colored isolated point, and outputs an output signal KAMI having a value of 0, if the target pixel is not a black-colored isolated point.

(Condition 1) The value V33 of the target pixel is smaller than the minimum value of pixel values V22, V23, V24, V32, V34, V42, V43, V44. The pixel value of each pixel can be represented by the following expression with symbols.

$$V33 < Min(V22, V23, V24, V32, V34, V42, V43, V44)$$

(Condition 2) The value obtained by adding an offset value OFFSET to value V33 of the target pixel is smaller than all of the average pixel value of two pixels continuous in the main scanning direction, the sub-scanning direction, the oblique direction to the right, and the oblique direction to the left. The pixel value of each pixel can be represented by the following expression with symbols.

$$V33 + OFFSET < (V11 + V22)/2 \text{ AND}$$
$$V33 + OFFSET < (V13 + V23)/2 \text{ AND}$$
$$V33 + OFFSET < (V15 + V24)/2 \text{ AND}$$
$$V33 + OFFSET < (V31 + V32)/2 \text{ AND}$$
$$V33 + OFFSET < (V35 + V34)/2 \text{ AND}$$
$$V33 + OFFSET < (V51 + V42)/2 \text{ AND}$$
$$V33 + OFFSET < (V53 + V43)/2 \text{ AND}$$
$$V33 + OFFSET < (V55 + V44)/2$$

It is noted that although here a detection filter for detecting a black-colored isolated point is shown, a detection filter for detecting a white-colored isolated point may be used to detect an isolated point. Thus, when white-colored paper dust or the like is stuck on copyboard 205, the paper dust can be detected as a foreign object. In such a case, the inequality sign shown in the above-noted condition 1 and condition 2 is reversed. Preferably, an isolated point is detected such that two kinds of isolated points, namely, a black-colored isolated point and a white-colored isolated point are detected.

Figure 13:
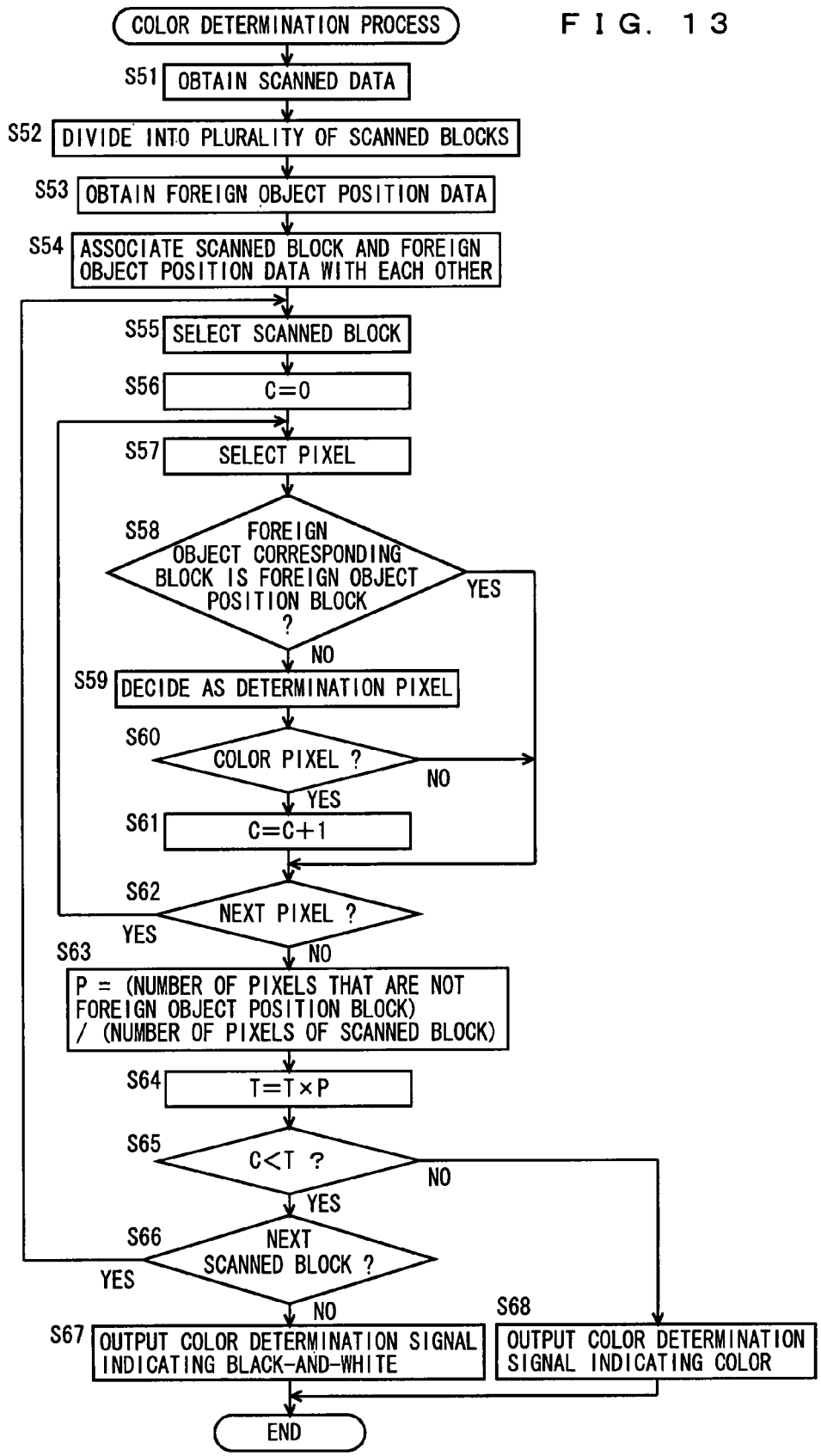
FIG. 13 is a flowchart illustrating an exemplary flow of a color determination process performed in a color determination portion.

FIG. 13 is a flowchart illustrating an exemplary flow of the color determination process performed in the color determination portion. The color determination process is a process performed by color determination portion 263 when color determination portion 263 is activated by CPU 281. Referring to FIG. 13, color determination portion 263 obtains scanned data (step S51) and divides the obtained scanned data into a plurality of scanned blocks. The scanned data is RGB data obtained by scanning original document 200 while copyboard 205 is moved as described above. Therefore, each of R data, G data and B data is divided into the same plurality of scanned blocks. Here, the scanned data is divided into 16 blocks in the main scanning direction and 32 blocks in the sub-scanning direction, by way of example.

Figure 14:
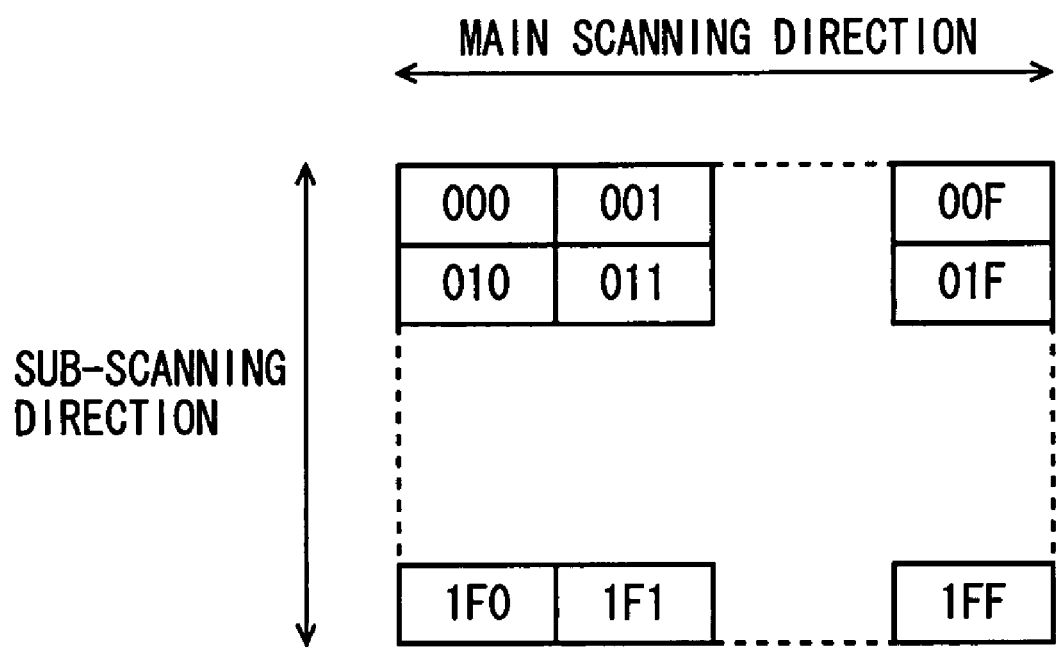
FIG. 14 is a diagram showing an example of a plurality of scanned blocks into which scanned data is divided.

FIG. 14 is a diagram showing an example of a plurality of scanned blocks into which the scanned data is divided. Referring to FIG. 14, the scanned data is divided into 16 equal parts in the main scanning direction (0-F in hexadecimal) and 32 equal parts in the sub-scanning direction (00-1F in hexadecimal). In the figure, each block is denoted with a three-digit number. A three-digit number represents a position in the main scanning direction by the first digit and a position in the sub-scanning direction by the second and third digits. For example, 1FF represents a scanned block which is the sixteenth in the main scanning direction and thirty-second in the sub-scanning direction.

Returning to FIG. 13, color determination portion 263 obtains foreign object position data at step S53. It is obtained by reading foreign object position data from RAM 283. Then, a scanned block of the scanned data is associated with the foreign object position data. Specifically, each of a plurality of scanned blocks of the scanned data is associated with a bit of the foreign object position data at the same scanned position. The foreign object position data includes 256×32 bits respectively in the main scanning direction and the sub-scanning direction, and the scanned data includes 16×32 bits. Here, while an original document is scanned, copyboard 205 moves by the width of copyboard 205. Therefore, in the main scanning direction, (16(n−1)+1)th bit to (16(n−1)+16)th bit in the main scanning direction of the foreign object position data are associated with the n-th scanned block in the main scanning direction of the scanned data, where n is an integer from 1 to 16. In the sub-scanning direction, the number of scanned blocks of the scanned data is equal to the number of bits of the foreign object position data. Therefore, the m-th bit in the sub-scanning direction of the foreign object position data is associated with the m-th scanned block in the sub-scanning direction of the scanned data, where m is an integer from 1 to 16. In this association, sixteen parts formed by dividing each of a plurality of scanned blocks of the scanned data into sixteen equal parts in the main scanning direction are respectively associated with sixteen bits of the foreign object position data in order. Here, the sixteen parts formed by dividing the scanned block into sixteen equal parts are referred to as foreign object corresponding blocks.

Then, color determination portion 263 selects one of a plurality of scanned blocks as a target (step S55). Then, a counter C is set to 0 (step S56). Counter C is a variable used to count the number of color pixels included in one scanned block.

Then, a pixel that is not included in the foreign object position data is selected from a plurality of pixels of the scanned data included in the scanned block selected at step S55. Specifically, a plurality of pixels of the scanned data included in the scanned block are selected as target pixels in order (step S57), and it is determined whether or not the foreign object corresponding block including the target pixel is a foreign object position block (step S58). If the value of the foreign object position data corresponding to the foreign object corresponding block including the target pixel is 1, it is determined that the foreign object corresponding block is a foreign object position block. If the value of the foreign object position data corresponding to the foreign object corresponding block including the target pixel is 0, it is determined that the foreign object corresponding block is not a foreign object position block. If the foreign object corresponding block is not a foreign object position block (NO at step S58), the process proceeds to step S59. If the foreign object corresponding block is a foreign object position block (YES at step S58), the process proceeds to step S62. This is to exclude the pixel of the scanned data corresponding to the foreign object position block from the color determination.

At step S59, the target pixel is decided as a determination pixel (step S59). Then, it is determined whether the determination pixel is color or black-and-white (step S60). If color, the process proceeds to step S61, and if black-and-white, step S61 is skipped and the process proceeds to step S62. Since the scanned data includes R data, G data and B data, the pixel of the scanned data includes a pixel of R, a pixel of G and a pixel of B. Color determination portion 263 first finds lightness V using the expression (1) and chroma W using the expression (2), where the value of a pixel of R is represented by a value R, the value of a pixel of G is represented by a value G and the value of a pixel of B is represented by a value B. Then, if chroma W is greater than a chroma reference that is associated with lightness V in advance, it is determined as color, if not greater, it is determined as black-and-white.

$$V=(\text{value } R \times Rr + \text{value } G \times Rg + \text{value } B \times Rb + 128)/256 \quad (1)$$

where Rr, Rg and Rb is a predetermined constant.

$$W=\text{MAX (value } R, \text{ value } G, \text{ value } B) - \text{MIN (value } R, \text{ value } G, \text{ value } B) \quad (2)$$

where MAX is a function to select a maximum value and MIN is a function to select a minimum value.

If the selected pixel is color, color determination portion 263 increments counter C by 1 (step S61) and the process proceeds to step S62. If the selected pixel is black-and-white, counter C is not incremented. Then, it is determined whether or not a pixel not included in the foreign object position block that has not yet been selected exists in the scanned block selected at step S55 (step S62). If exist, the process returns to step S57. If not exist, the process proceeds to step S63. Then, color determination portion 263 calculates a ratio P of the number of pixels that are not the foreign object position blocks to the number of pixels included in the scanned block selected at step S55 (step S63), and threshold value T is changed by multiplying threshold value T by ratio P (step S64). Then, counter C is compared with threshold value T (step S65). If counter C is smaller than threshold value T, the process proceeds to step S66. If counter C is not smaller than threshold value T, the process proceeds to step S68. At step S68, color determination portion 263 determines that the original document is color and outputs a color determination signal to color correction portion 261 to indicate that the original document is color, and the process then ends. On the other hand, at step S66, color determination portion 263 determines whether or not a scanned block that has not yet been processed exists. If an unprocessed scanned block exists, the process returns to step S55. If not exist, color determination portion 263 determines that the original document is black-and-white and outputs a color determination signal to color correction portion 261 to indicate that the original document is black-and-white (step S67), and the process then ends. In other words, if the number of color pixels exceeds threshold value T in at least one scanned block of a plurality (16×32) of scanned blocks, color determination portion 263 determines that the original document is color and outputs a color determination signal to color correction portion 263.

FIG. 15 is a block diagram showing a configuration of the color correction portion. Referring to FIG. 15, color correction portion 261 receives three data of Lab from color conversion portion 259 and receives a color determination signal from color determination portion 263. Color correction portion 261 includes a table conversion portion 301 receiving Lab data, a Log conversion portion 302 receiving L data, and switches 303A, 303B, 303C, 303D.

Table conversion portion 301 includes a lookup table for color conversion and converts L data, a data, and b data into C data of cyan, M data of magenta, Y data of yellow and K1 data of black for full-color printing to input C data to input terminal A of switch 303A, M data to input terminal A of switch 303B, Y data to input terminal A of switch 303C, and K1 data to input terminal A of switch 303D. Log conversion portion 302 has a Log conversion table and converts L data into K2 data for black-and-white printing to input K2 data to input terminal B of switch 303D.

Switches 303A, 303B, 303C, 303D receive a color determination signal from color determination portion 263 at input terminal S. The color determination signal goes high to indicate the original document is color and goes low to indicate the original document is black-and-white. Switches 303A, 303B, 303C each receive a signal 00 at input terminal B. If a high color determination signal is input to input terminal S, switches 303A, 303B, 303C, 303D select input terminal A to output data input from input terminal A from output terminal Y. If a low color determination signal is input to input terminal S, switches 303A, 303B, 303C, 303D select input terminal B to output data input from input terminal B from output terminal Y. Therefore, if the color determination signal is high, C data, M data, Y data and K1 data for full-color printing are output. If the color determination signal is low, all of C data, M data, Y data are 00 so that K2 data for black-and-white printing is output from switch 303D.

It is noted that in the present embodiment, the detection data is divided into a plurality of blocks so that foreign object position data is generated. The scanned data is divided into a plurality of scanned blocks so that each of a plurality of scanned blocks is associated with the foreign object position data. This is to improve the process speed with reduced data to be processed and to reduce a storage capacity to be used. Without dividing the detection data and the scanned data, each of a plurality of pixels of the scanned data may be associated with an isolated point detected from the detection data.

As described above, in image scanning apparatus 10 in the present embodiment, three line sensors 213R, 213G, 213B having filters having spectral sensitivities different from each other and scanning the original document in the sub-scanning direction are disposed in a predetermined order at intervals in the sub-scanning direction. Copyboard 205 provided between original document 200 and three line sensors 213R, 213G, 213B moves relatively to three line sensors 213R, 213G, 213B at a speed different from the speed of conveying original document 200. In-line correction portion 255 synchronizes R data, G data and B data output by three line sensors 213R, 213G, 213B such that those data become data that are output by three line sensors respectively scanning the same portion of original document 20. Accordingly, if a foreign object exists on the copyboard, the foreign object is scanned at different positions of original document 200 respectively by three line sensors 213R, 213G, 213B. Thus, in spite of a black-and-white original document, the portion where the foreign object is scanned becomes chromatic. In addition, in image scanning apparatus 10, before original document 200 is conveyed, foreign object position detection portion 265 detects the position on copyboard 205 of the foreign object present on copyboard 205, and color determination portion 263 decides, based on the position on copyboard 205 of the foreign object detected by foreign object position detection portion 265, a determination pixel to be used for determination from a plurality of pixels included in each scanned data obtained while original document 200 is conveyed to document scanning position E (step S57), and determines whether the original document is color or black-and-white, based on the decided determination pixel (step S58-step S66). Therefore, it is determined whether original document 200 is color or black-and-white based on a pixel value of a pixel excluding the portion at which a foreign object is scanned, thereby improving the accuracy of color determination.

In addition, color conversion portion 259 generates lightness data L based on R data, G data and B data output by in-line correction portion 255. Foreign object position detection portion 265 obtains as detection data lightness data L generated by color conversion portion 259 while motor 219 is conveying copyboard 205 (step S241), and detects an isolated point from the detection data (step S44). Thus, the position on copyboard 205 of the foreign object stuck on copyboard 205 can be detected. Color determination portion 263 associates each of R data, G data and B data obtained by scanning original document 200 with the detection data (step S54) and selects as a pixel to be used for color determination a pixel excluding a pixel corresponding to the isolated point of a plurality of pixels included in R data, G data and B data obtained by scanning original document 200 (step S57).

Thus, a pixel at which a foreign object is scanned can be eliminated from R data, G data and B data to be used for color determination.

In addition, color determination portion 263 determines whether or not a pixel excluding the pixel corresponding to the isolated point of a plurality of pixels included in each of R data, G data and B data obtained by scanning original document 200 is a color pixel (step S58), counts the number of pixels determined as color pixels (step S59), and compares the number of counted color pixels with threshold value T (step S63). Therefore, it is possible to determine accurately whether an original document is color or black-and-white.

In addition, color determination portion 263 changes threshold value T depending on the ratio P of the number of pixels corresponding to an isolated point, of the number of a plurality of pixels included in each of R data, G data and B data obtained by scanning original document 200 (step S62), thereby improving the accuracy of color determination.

Furthermore, color conversion portion 259 generates lightness data L based on R data, G data and B data output by in-line correction portion 255. Foreign object position detection portion 265 obtains as detection data lightness data L generated by color conversion portion 259 while motor 219 is moving copyboard 205 (step S41), divides the detection data into a plurality of blocks (step S42), and extracts a foreign object position block including at least one isolated point from a plurality of blocks (step S44, step S45). Color determination portion 263 divides each of a plurality of scanned data into a plurality of scanned blocks (step S52), associates each of a plurality of scanned blocks with a bit of the foreign object position data at the same scanned position as the scanned block (step S54), decides as a determination pixel a pixel excluding the pixel corresponding to the foreign object position block of the pixels of the scanned data included in a plurality of scanned blocks (step S57), and counts the number of color pixels of the determination pixels included in each of a plurality of scanned blocks (step S58, step S59). Thus, the position of a foreign object is detected on the basis of blocks into which the detection data is divided, thereby improving the process speed and additionally improving the accuracy of color determination.

It is noted that although in the foregoing embodiment, a method of moving copyboard 205 with line sensors 213R, 213G, 213B fixed has been described, the present invention is not limited thereto. Any method may be employed as long as copyboard 205 and line sensors 213R, 213G, 213B are moved relatively to each other. By moving copyboard 205 and line sensors 213R, 213G, 213B relatively to each other, a scanning position corresponding to each of line sensors 213R, 213G, 213B on copyboard 205 is moved. Therefore, in addition to the method of moving copyboard 205 with line sensors 213R, 213G, 213B fixed, the method of moving copyboard 205 and line sensors 213R, 213G, 213B relatively to each other includes a method of moving line sensors 213R, 213G, 213B with copyboard 215 fixed, a method of moving slider 210 with copyboard 215 and line sensors 213R, 213G, 213B fixed, a method of rotating reflection mirror 209A with copyboard 215, line sensors 213R, 213G, 213B and slider 210 fixed.

In the foregoing embodiment, MFP 100 has been illustrated. However, it is needless to say that the present invention can be understood as a color determination method for causing image scanning apparatus 10 to perform the foreign object position detection process shown in FIG. 10 and the color determination process shown in FIG. 13.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image scanning apparatus comprising:
a plurality of line sensors having filters having spectral sensitivities different from each other and being arranged at intervals in a sub-scanning direction in a predetermined order to scan an original document in the sub-scanning direction;
a copyboard provided between an original document and said plurality of line sensors;
an original document conveyance portion to convey an original document to a scanning position of said plurality of line sensors;
a moving portion to move said copyboard and said plurality of line sensors relatively to each other at a speed different from a speed at which said original document conveyance portion conveys an original document;
an in-line correction portion to synchronize a plurality of data, each including a plurality of pixels, output by said plurality of sensors such that said plurality of data become data that are output by said plurality of line sensors respectively scanning a same portion of an original document;
a position detection portion to detect a position on the copyboard of a foreign object stuck on said copyboard before said original document conveyance portion conveys an original document;
a determination pixel decision portion to decide a determination pixel to be used for determination from a plurality of pixels included in each of a plurality of scanned data output by said in-line correction portion while an original document is passing through said scanning position, based on a position detected by said position detection portion; and
a determination portion to determine whether an original document is color or black-and-white, based on said decided determination pixel of each of said plurality of scanned data.

2. The image scanning apparatus according to claim 1, further comprising a detection data obtaining portion to generate detection data from said plurality of data output by said in-line correction portion while said moving portion is moving said copyboard, wherein
said position detection portion includes an isolated point detection portion to detect an isolated point from said detection data, and
said determination pixel decision portion includes an association portion to associate each of said plurality of scanned data with said detection data and decides as a determination pixel a pixel excluding a pixel corresponding to said isolated point of a plurality of pixels included in each of said plurality of scanned data.

3. The image scanning apparatus according to claim 1, wherein
said determination portion includes
a color pixel determination portion to determine whether or not said decided determination pixel included in each of said plurality of scanned data is a color pixel,
a count portion to count a number of pixels determined as said color pixel, and
a comparison portion to compare said counted number of color pixels with a prescribed threshold value.

4. The image scanning apparatus according to claim 3, wherein said determination portion further includes a change portion to change said prescribed threshold value depending on a ratio of said number of determination pixels of a number of a plurality of pixels included in each of a plurality of scanned data.

5. The image scanning apparatus according to claim 1, further comprising a detection data obtaining portion to generate detection data from said plurality of data output by said in-line correction portion while said moving portion is moving said copyboard, wherein
said position detection portion includes
a first region division portion to divide said detection data into a plurality of first regions and
an isolated point region extraction portion to extract an isolated point region including at least one isolated point from said plurality of first regions, and
said determination portion includes
a second region division portion to divide each of said plurality of scanned data into a plurality of second regions,
an association portion to associate each of said plurality of second regions with the first region at a same scanned position as the second region, of said plurality of first regions,
a determination pixel decision portion to decide as a determination pixel a pixel excluding a pixel included in said isolated point region, of pixels included in said plurality of second regions, and
a count portion to count a number of color pixels, of said determination pixels included in each of said plurality of second regions.

6. The image scanning apparatus according to claim 5, wherein said determination portion further includes a comparison portion to compare said counted number of color pixels of said plurality of second regions with a prescribed threshold value.

7. The image scanning apparatus according to claim 6, wherein said determination portion further includes a change portion to change said prescribed threshold value depending on a ratio of said number of determination pixels of a number of a plurality of pixels included in the second region, for each of said plurality of second regions.

8. The image scanning apparatus according to claim 6, wherein said determination portion determines that an original document is color if, of said plurality of second regions, there exists at least one second region in which said counted number of color pixels exceeds a prescribed threshold value, and said determination portion determines that an original document is black-and-white if there does not exist a second region in which said counted number of color pixels exceeds a prescribed threshold value.

9. A color determination method performed in an image scanning apparatus including
a plurality of line sensors having filters having spectral sensitivities different from each other and being arranged at intervals in a sub-scanning direction in a predetermined order to scan an original document in the sub-scanning direction,
a copyboard provided between an original document and said plurality of line sensors,
an original document conveyance portion to convey an original document to a scanning position of said plurality of line sensors, and
a moving portion to move said copyboard and said plurality of line sensors relatively to each other at a speed different from a speed at which said original document conveyance portion conveys an original document,
said method comprising the steps of synchronizing a plurality of data, each including a plurality of pixels, output by said plurality of line sensors such that the plurality of data become data that are output by said plurality of line sensors respectively scanning a same portion of an original document;

detecting a position on the copyboard of a foreign object stuck on said copyboard before said original document conveyance portion conveys an original document;

deciding a determination pixel to be used for determination from a plurality of pixels included in each of a plurality of scanned data output by said in-line correction portion while an original document is passing through said scanning position, based on a position detected by said position detection step; and determining whether an original document is color or black-and-white based on said decided determination pixel of each of said plurality of scanned data.

10. The color determination method according to claim 9, wherein
said position detection step includes the steps of
generating detection data from said plurality of data output by said in-line correction portion while said moving portion is moving said copyboard and
detecting an isolated point from said detection data, and
said step of deciding a determination pixel includes the steps of
associating each of said plurality of scanned data with said detection data and
deciding as a determination pixel a pixel excluding a pixel corresponding to said isolated point of a plurality of pixels included in each of said plurality of scanned data.

11. The color determination method according to claim 9, wherein
said determination portion includes the steps of
determining whether or not said decided determination pixel included in each of said plurality of scanned data is a color pixel,
counting a number of pixels determined as said color pixel, and
comparing said counted number of color pixels with a prescribed threshold value.

12. The color determination method according to claim 11, further comprising the step of changing said prescribed threshold value depending on a ratio of said number of determination pixels of a number of a plurality of pixels included in each of a plurality of scanned data.

13. The color determination method according to claim 9, wherein
said position detection step includes the steps of
generating detection data from said plurality of data output by said in-line correction portion while said moving portion is moving said copyboard,
dividing said detection data into a plurality of first regions, and
extracting an isolated point region including at least one isolated point from said plurality of first regions, and
said determination step includes the steps of
dividing each of said plurality of scanned data into a plurality of second regions,
associating each of said plurality of second regions with the first region at a same scanned position as the second region, of said plurality of first regions,
deciding as a determination pixel a pixel excluding a pixel corresponding to said isolated point region of pixels included in said plurality of second regions, and
counting a number of color pixels of said determination pixels included in each of said second plurality of pixels.

14. The color determination method according to claim 13, wherein said determination step further includes the step of comparing said counted number of color pixels of said plurality of second regions with a prescribed threshold value.

15. The color determination method according to claim 14, wherein said determination step further includes the step of changing said prescribed threshold value depending on a ratio of a number of pixels corresponding to said isolated point region of a number of a plurality of pixels included in the second region, for each of said plurality of second regions.

16. The color determination method according to claim 14, wherein said determination step determines that an original document is color if, of said plurality of second regions, there exists at least one second region in which said counted number of color pixels exceeds a prescribed threshold value, and said determination step determines that an original document is black-and-white if there does not exist a second region in which said counted number of color pixels exceeds a prescribed threshold value.

* * * * *